(12) United States Patent
Sakane et al.

(10) Patent No.: US 6,554,312 B2
(45) Date of Patent: Apr. 29, 2003

(54) AIR BAG MODULE MOUNTING STRUCTURE

(75) Inventors: Katsunobu Sakane, Nishikasugai-gun (JP); Norinari Nagata, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/891,291

(22) Filed: Jun. 27, 2001

(65) Prior Publication Data

US 2001/0054810 A1 Dec. 27, 2001

(30) Foreign Application Priority Data

Jun. 27, 2000 (JP) .................................. 2000-193461
Jun. 29, 2000 (JP) .................................. 2000-196553
Jun. 30, 2000 (JP) .................................. 2000-198184
Jan. 30, 2001 (JP) .................................. 2001-021280
Jan. 31, 2001 (JP) .................................. 2001-023088

(51) Int. Cl.[7] ............................................. B60R 21/16
(52) U.S. Cl. ................................. 280/728.2; 280/731
(58) Field of Search ......................... 280/728.2, 728.3, 280/731, 728.1

(56) References Cited

U.S. PATENT DOCUMENTS

| | | | | |
|---|---|---|---|---|
| 5,421,607 A | * | 6/1995 | Gordon | 280/728.2 |
| 5,470,100 A | * | 11/1995 | Gordon | 280/728.2 |
| 5,931,492 A | * | 8/1999 | Mueller et al. | 280/728.2 |
| 6,196,573 B1 | * | 3/2001 | Worrell et al. | 280/728.2 |
| 6,276,711 B1 | * | 8/2001 | Kurz et al. | 280/728.2 |
| 6,325,408 B1 | * | 12/2001 | Ford | 280/728.2 |

FOREIGN PATENT DOCUMENTS

| | | |
|---|---|---|
| DE | 29806933 U | 7/1998 |
| EP | 0741063 A | 11/1996 |
| EP | 1103430 A | 5/2001 |
| FR | 2790044 | 8/2000 |
| JP | 10-500922 | 1/1998 |
| JP | 11-59304 | 3/1999 |
| WO | WO 96/24511 | 8/1996 |

OTHER PUBLICATIONS

"Snap–In Inflatable Restraint Module Mounting System for Steering Wheels" research disclosure, Kenneth Mason Publication, Hampshire, GB, No. 403, Nov. 1, 1997, p. 825 XP000726737, ISSN: 0374–4353.

* cited by examiner

Primary Examiner—Paul N. Dickson
Assistant Examiner—Faye M. Fleming
(74) Attorney, Agent, or Firm—Law Offices Of David G. Posz

(57) ABSTRACT

A plurality of pins provided on a bottom surface of an air bag module in such a manner as to protrude therefrom are allowed to pass through a plurality of passage holes formed in a steering wheel, respectively, so that hook portions formed in the respective pins are brought into engagement with a locking wire constituted by a single continuous resilient wire which is provided so as to extend over the respective passage holes whereby the air bag module is mounted on the steering wheel. The locking wire is brought into engagement with a lock projection by push moving the locking wire by an operating portion so that the locking wire is held at a release position, while the engagement between the locking wire and the plurality of hook portions is released at one time.

12 Claims, 22 Drawing Sheets

AIR BAG MODULE MOUNTING STRUCTURE

BACKGROUND OF THE INVENTION

1. Field of the Invention

The present invention relates to an air bag module mounting structure for mounting an air bag module on a steering wheel of a vehicle or the like.

The present application is based on Japanese Patent Applications No. 2000-193461, 2000-196553, 2000-198184, 2001-21280 and 2001-23088, which are incorporated herein by reference.

2. Description of the Related Art

An air bag mounting structure disclosed, for example, in JP 10-500922 is known as an air bag mounting structure of this kind. Namely, in the disclosed conventional structure, a plurality of (for example, four) pins are provided on the bottom of an air bag module in such a manner as to protrude therefrom and hook portions are formed on distal ends of the plurality of pins. A plurality of (for example, two) holding members are mounted on a core of a steering wheel and a plurality of (For example, two) passage holes are formed in the plurality of holding members in such a manner as to confront the pins. A resilient Locking wire is mounted on each of the holding members and the locking wires so mounted are disposed in such a manner as to partially extend over the respective passage holes in a direction in which the locking wires intersect with the axes of the passage holes. In addition, working holes are formed in a back cover of the steering wheel, which working holes are adapted to confront four locking locations where the hook portions and the locking wires are locked to each other.

Then, in a case where the air bag module is mounted on the steering wheel, the plurality of pins are allowed to pass through the passage holes so that the hook portions on the respective pins are brought into engagement with the locking wires in the passage holes, whereby the air bag module is locked and held onto the steering wheel in a locked fashion.

On the contrary, in a case where the air bag module is removed from the steering wheel, a removing tool such as a screw driver is inserted into the respective locking locations from the working holes so as to release the locking wires from the engagement with the hook portions sequentially against the resiliency of the locking wires. In this state, the air bag module is separated away from the steering wheel in such a manner that the pins on the air bag module are drawn out of the passage holes in the holding members so that the air bag module is removed from the steering wheel.

In the aforementioned conventional air bag module mounting structure, however, for example, in a case where the air bag module needs to be replaced after it has been mounted once, there has occurred a problem that the air bag module so mounted is difficult to be removed from the steering wheel.

Namely, with a steering wheel of a four-spoke type, working holes are formed in a back cover of the steering wheel in such a manner as to confront four locking locations where the hook portions and the locking wires are locked to each other. In this construction, in order to remove the air bag module from the steering wheel, a removing tool such as a screw driver is inserted into each of the mounting locations from the working hole so that the locking wires are deformed against their resiliency to thereby be released from the engagement with the hook portions. Thus, the engagement between the hook portions and the locking wires at the plurality of locking locations needs to be released sequentially using the screw drivers or the like, and therefore the removing work tends to become extremely troublesome and a long working time is needed.

Further, the air bag module is required to be separated from the steering wheel in a state in which the engagement between the hook portions and the locking wires is released with the removing tools at the plurality of locking locations. In this removing construction, in the event that the removing tool is dislocated from the locking location for some reason, the resilient deformation of the locking wires is released, whereby there may be caused a risk that the locking wires are abruptly returned to the lock positions thereof. Here, the steering wheel is mounted in an inclined fashion with a side of the steering wheel where the air bag module is mounted being oriented upwardly relative to the steering shaft. This has led to a problem that the pin or pins which are released from the engagement with the locking wires are caused to fall in the passage holes again by virtue of the gravity of the steering wheel for re-engagement with the locking wires.

Moreover, with the steering wheel being mounted on the steering shaft, air bag module removing work needs to be carried out from the back side of the steering wheel or within a narrow space formed between the steering wheel and the instrument panel. This makes extremely troublesome the insertion of the removing tools into the locking locations in trying to release the engagement between the hook portions and the locking wires, and moreover, the inserted removing tools have tended to be easily dislocate, requiring a long working time for removal of the air bag module.

Further, a steering wheel with an air bag device disclosed, for example, in JP 11-59304 is also known as a steering wheel with an air bag device of this type.

Namely, as shown in FIG. 29, the conventional steering wheel 100 comprises an air bag module 110 adapted to oscillate relative to a core 101 thereof and a plurality of horn switch mechanisms 130. A hole 103 is formed in each spoke portion 102 of the core 101 of the steering wheel 100, and locking members 111 are provided on a bottom of the air bag module 110 which are adapted to engage with the holes 103, respectively, in such a manner as to oscillate relative to the holes 103. The locking member comprises a base portion 112a and a plurality of locking pawls 113 forming as a whole a cylindrical shape adapted to be contracted diametrically. A through hole 112a is formed in the base portion 112 at a central portion thereof, and an annular breakable groove is formed in the outer circumference of the base portion 112. On the other hand, a taper portion 113a is formed at an inner circumferential distal portion of the locking pawls 113 which is formed such that the inner circumference thereof expands diametrically toward the distal end thereof. The locking member 111 is screwed to the core with a pin 120 having a threaded portion 121 which is allowed to pass through the through hole 112a and a mounting hole 110a in the air bag module 110 and a nut 123 screwed on the threaded portion 121. Provided at an opposite end to the threaded portion 121 of the pin 120 is a head portion 122 which is spaced away from the locking pawls 113 and which has an outer circumferential surface tapered so as to conform to the taper portion 113a of the locking pawls 113. In addition, springs 125 are provided between the air bag module 110 and the spoke portions 102 for biasing the air bag module 110 and the spoke portion 102 in directions in which they are separated away from each other.

In the air bag module 110 disposed as described above, when a cover 110b disposed at an upper portion thereof is pressed in a direction toward the core 101 (in a direction indicated by an arrow A in FIG. 29) against the biasing force exerted by the springs 125, the locking members 111 and the pins 120 are also displaced in the same direction. On the contrary, when the force pressing down the cover 110b is removed the locking members 111 and the pins 120 are displaced by the biasing force of the springs 125 in an opposite direction to the direction in which they are pressed down to a position where the locking pawls 113 are brought into engagement with circumferential edge portions of the holes 103 in the spoke portions 102.

In addition, the horn switch mechanisms 130 are provided in the vicinity of the locking members 111, respectively, between the air bag module 110 and the spoke portions 102. The horn switch mechanism 130 comprises contacts 131 mounted on the air bag modules 110 and contacts 132 mounted on the spoke portions 120 in such a manner as to be spaced away from the contacts 131, respectively. These contacts 131, 132 are brought into contact with each other when the cover 110b is pressed down in the direction A and the air bag module 110 is displaced, and on the contrary, when the pressing force is removed and the air bag module 110 is displaced in the opposite direction to the direction A, the contacts are separated away from each other. Thus, in this steering wheel 100, the air bag module 110 also functions as part of the horn switch, and the steering wheel 100 is constructed as a steering wheel of a so-called floating type.

Incidentally, when an impact which is greater than a predetermined magnitude is applied to a vehicle equipped with the steering wheel 100 an air bag 110c installed in the interior of the air bag module 110 is deployed. As this occurs, a force of an extremely large magnitude is exerted on a bottom portion of the air bag module in a direction in which the air bag module 110 is separated away from the core 101.

In the steering wheel 100, in the event that the force of such a great magnitude is applied thereto, the locking members 111 are adapted to be broken at the breakable grooves 114 in the base portion 112 before the engagement between the locking pawls 113 on the locking members 111 and the holes 103 in the spoke portions 120 is released. Then, with this breakage at the grooves, the air bag module 110 is displaced in the opposite direction to the direction A together with the base portions 112 of the locking members 111 and the pins 120, and the head portions 122 of the pins 120 are brought into contact with the taper portion 113a of the locking pawls 113. The contact of the head portions 122 with the locking pawls 113 regulates the displacement of the air bag module 110 in the opposite direction to the direction A.

Incidentally, the conventional structure as described above has caused the following problems.

Namely, the horn switch mechanisms 130 are constructed not to operate before the air bag module constituted by a number of components is assembled to the core 101. In a case where the control of the stroke of the horn switch mechanism 130 is tried to be implemented in this construction, the required control has to be carried out after the air bag module 110 has been assembled to the core 101, and in the event that there are caused errors in production and assembly of the components, it is difficult to set a predetermined stroke by correcting those errors.

In addition, in the locking member 111, the supporting strength with which the locking member 111 is locked into the core 101 and the breaking strength at which the locking member 111 breaks at the breakable groove 114 needs to be set with finely controlled balance and good accuracy. That is, with the supporting strength being set too high, the rigidity of the locking member 111 is increased, and when an assembling person tries to assemble the components, there may be caused a problem that the locking member 111 is difficult to be fitted in the hole 103. In contrast to this, with the supporting strength being set too low, at the time of operation of the air bag module 110, there may be caused a risk that the engagement between the locking pawls 113 and the circumferential edge portions of the holes 103 is released before the locking members 111 break at the breakable grooves 114, thereby causing in turn a risk that the holding of the air bag module 110 becomes unstable.

Additionally, the core 101 is normally formed by casting. Due to this, the resin hole 103 into which the locking member 111 is inserted in such a manner as to oscillate relative to the hole needs to be worked so accurately that there is left no burr on an inner circumferential surface thereof in order to secure the smooth oscillation of the locking member 111 relative to the hole 103. This serves to increase the production cost.

Furthermore, in this conventional construction, since the pin 120 itself oscillates, the supporting rigidity of the air bag module 110 tends to become unstable. To cope with this, for example, a counter measures is taken to prevent the generation of a risk of the horn being activated against the driver's intention by the unbalanced sinking (so-called rolling) of the air bag module 110 during a sudden turning of the vehicle by increasing the load of the springs 125. The increase in load of the spring 125 makes the driver feel that the weight of the air bag module 110 is heavy to operate when he or she tries to operate the horn, thus deteriorating the operation feeling of the horn.

SUMMARY OF THE INVENTION

The invention was made in view of the problems inherent in the conventional air bag module mounting structure, and an object thereof is to provide an air bag module mounting structure for facilitating the removal of an air bag module from a steering wheel.

With a view to attaining the object, according to a first aspect of the invention, there is provided an air bag module mounting structure in which an air bag module is mounted on a steering wheel by allowing a plurality of pins provided on a bottom of the air bag module in such a manner as to protrude therefrom to pass through a plurality of passage holes formed in a steering wheel and bringing a hook portion formed in each of the plurality of pins into engagement with a locking body provided in the plurality of passage holes, the air bag module mounting structure being characterized by provision of a changeover member for changing over the status of the locking body between a lockable status where the air bag module is allowed to be locked onto the steering wheel and a removable status where the air bag module is allowed to be removed from the steering wheel for disposition of the locking body in each of the statuses.

Thus, according to the first aspect of the invention, by changing over the status of the locking body to the removable status for disposition of the locking body in that status the removal of the air bag module can be facilitated while preventing the abrupt return of the locking body to the lockable status.

In the first aspect of the invention, the change over member may be adapted to hold the locking body in the removable status when the air bag module is removed from the steering wheel.

Thus, since the locking body is held in the removable status when the air bag module is removed, the removal of the air bag module can be implemented quickly and more easily.

In the above air bag module, the changeover member may include return means for returning the locking body disposed in the removable status to the lockable status.

Thus, the locking body can be easily returned to the lockable status by operating the return means after the removal of the air bag module has been completed, whereby when the air bag module is mounted again on the steering wheel the required mounting work can be carried out quickly and easily.

Further, the locking body may be constituted by a single continuous wire formed into substantially a ring-like shape.

Thus, the number of parts can be reduced, and when removing the air bag module, the status of the single locking body only has to be changed over to the removal status for disposition thereof in that status, whereby the removal of the air bag module can be implemented more quickly and easily.

Still further, when disposed in the removable status the locking body may be adapted to be released from the engagement with the plurality of hook portions at one time.

Thus, the engagement between the hook portions and the locking body at the plurality of locations can be released at one time by changing over the locking body to the removable status for disposition thereof in that status.

Still further, the return means is adapted to return the locking means from the removable status to the lockable status by making use of its own resiliency.

Thus, the locking body can be automatically returned to the lockable status by its own resiliency by operating the return means, whereby when the air bag module is mounted again on the steering wheel the required mounting work can be carried out more quickly and easily.

Still further, at least part of the changeover member may be also adapted to function as an operating portion for moving the locking body from a lock position where the locking body is brought into engagement with the plurality of pins to a release position where the locking body is released from the engagement with the plurality of pins.

Thus, the changeover member can be constructed with a simple structure without increasing the number of parts.

Furthermore, the change over member can include an engagement portion adapted to be brought into engagement with the operating portion.

Thus, the locking body can be held in the release position in a more ensured fashion by bringing the operating portion into engagement with the engagement portion.

Furthermore, the passage holes may be formed in a holding member mounted on a core of the steering wheel, and the locking body may be mounted on the holding member in such a manner as to be moved thereon between the lock position where the locking body is brought into engagement with the plurality of pins and the release position where the locking body is released from the engagement with the plurality of pins.

Thus, the plurality of passage holes and at least the part of the changeover member can easily be formed in the holding member formed of synthetic resin or the like. In addition, the locking body can easily be mounted on a core of the steering wheel via the holding member.

According to a second aspect of the invention, there is provided an air bag module mounting structure in which an air bag module is mounted on a steering wheel by allowing a plurality of pins provided on a bottom of the air bag module in such a manner as to protrude therefrom to pass through a plurality of passage holes formed in a steering wheel and bringing a hook portion formed in each of the plurality of pins into engagement with a locking body provided in the plurality of passage holes, the air bag module mounting structure being characterized in that the locking body is constituted by a single continuous resilient wire, and that the engagement of the locking body with the plurality of hook portions is released at one time by displacing the locking body to a release position.

Thus, according to the first aspect of the invention, the engagement between the hook portions and the locking body at the plurality of locking locations can be released at one time by displacing the locking body to the release position through a one-touch or single operation, whereby the air bag module can easily be removed from the steering wheel.

The locking body may be formed into substantially a ring-like shape which is partially opened there along and is constructed so as to be diametrically contracted or expanded against its own resiliency in conjunction with the movement thereof to the release position.

Thus, the engagement between the hook portions and the locking body at the plurality of locking locations can easily be released through diametrical contraction or expansion of the locking body at the release position.

In addition, recess portions may be formed on the locking body for releasing the engagement of the locking body with the hook portions with the locking body being displaced to the release position.

Thus, the recess portions of the locking body are allowed to confront the hook portions through a small displacement of the locking wire to the release position, whereby the engagement between the hook portions and the locking body can easily be released.

In addition, an operating portion may be provided on the locking body for displacing the locking body to the release position.

Thus, the locking body can easily be displaced to the release position through operation of the operating portion.

Further, holding portions may be provided on the steering wheel for holding the locking body at positions confronting said passage holes, respectively, and the locking body may be constructed to be separated away from the holding portions with the hook portions in the pins being in engagement with the locking body.

Thus, the locking body can be held in the mounted status where the locking body corresponds to the respective passage holes by the holding portions in an ensured fashion, and when the hook portions in the respective pins are brought into engagement with the locking body the locking body is separated away from the holding portions and is then brought into a press engagement with the hook portions by virtue of its own resiliency, whereby the air bag module can rigidly be locked and held onto the steering wheel.

Further, the pins and passage holes may be provided at least three, respectively.

Thus, the air bag module can be locked and held onto the steering wheel at three or more locking locations in a stable fashion.

Further, the passage holes may be formed in a holding member mounted on a core of the steering wheel, and the locking body may be mounted on the holding member in such a manner as to be moved between a lock position and the release position.

Thus, the plurality of passage holes can easily be formed in the holding member formed from a synthetic resin, and the locking body can simply be mounted on the holding member.

Still further, the locking body may be brought into engagement with the hook portions from inside of the respective pins and be diametrically contracted when the locking body is operated so as to be moved to the release position, whereby the engagement of the locking body with the respective hook portions is released.

Thus, when the locking body is operated so as to be moved to the lock position the locking body is diametrically contracted inwardly of the respective pins, whereby the engagement between the locking body and the respective hook portions can easily be released.

Furthermore, the locking body may be brought into engagement with the hook portions from outside of the respective pins and be diametrically expanded when the locking body is operated so as to be moved to the release position, whereby the engagement of the locking body with the respective hook portions is released.

Thus, when the locking body is operated so as to be moved to the lock position the locking body is diametrically expanded outwardly of the respective pins, whereby the engagement between the locking body and the respective hook portions can easily be released.

According to a third aspect of the invention, there is provided an air bag module mounting structure in which an air bag module is mounted on a steering wheel by allowing a plurality of pins provided on a bottom of the air bag module in such a manner as to protrude therefrom to pass through a plurality of passage holes formed in a steering wheel and bringing a hook portion formed in each of the plurality of pins into engagement with a locking body provided in the plurality of passage holes, the air bag module mounting structure being characterized in that the locking body is constituted by a single continuous wire which is formed into substantially a ring-like shape and that the engagement of the locking body with the plurality of hook portions is released at one time by rotating the locking body to a release position.

Thus, the engagement of the hook portions and the locking body at the plurality of locking locations can be released at one time by rotating the locking body to the release position through a one-touch or single operation, whereby the air bag module can easily be removed from the steering wheel.

In the an air bag module mounting structure, recess portions may be formed on the locking body for releasing the engagement of the locking body with the hook portions with the locking body being rotated to the release position.

Thus, the recess portions on the locking body are allowed to confront the hook portions by rotating the locking wire to the release position, whereby the engagement between the hook portions and the locking body can easily be released.

In addition, an operating portion may be provided on the locking body for rotating the locking body to the release Thus, the locking body can easily be rotated to the release position by operating the operating portion.

In addition, holding portions may be provided on the steering wheel for holding the locking body at positions confronting the passage holes, respectively, and the locking body may be constructed to be separated away from the holding portions with the hook portions in the pins being in engagement with the locking body.

Thus, the locking body can be held in a mounted status in which the locking body is allowed to confront the respective passage holes by the holding portions in an ensured fashion. Then, when the hook portions in the respective pins are brought into engagement with the locking body the locking body is separated away from the holding portions and is then brought into a press engagement with the hook portions, whereby the air bag module can rigidly be locked and held onto the steering wheel.

Further, the pins and passage holes are provided at least three, respectively.

Thus, the air bag module can be locked and held stably onto the steering wheel at three or more locking locations.

The passage holes may be formed in a holding member mounted on a core of the steering wheel, and the locking body may be mounted on the holding member in such a manner as to be rotated between a lock position and said release position.

Thus, the plurality of passage holes can easily be formed in the holding member formed from a synthetic resin or the like and moreover, the locking body can simply be mounted on the holding member.

According to a fourth aspect of the invention, there is provided an air bag module mounting structure in which a plurality of pins provided on one of either a bottom or external side of an air bag module and an opposite side of a steering wheel main body which confronts either the bottom or external side of the air bag module in such a manner as to protrude there from are allowed to pass through a plurality of passage holes formed in the other of either said bottom or external side of said air bag module and the opposite side of the steering wheel main body, respectively, and in which a hook portion formed in each of the pins is brought into engagement with a locking body provided in such a manner as to extend over the passage holes, whereby the air bag module is mounted on a steering wheel, the air bag module mounting structure being characterized in that an operating portion is provided on the locking body for changing over the status of the locking body between a lockable status in which the air bag module can be locked onto the steering and a removable status in which the air bag module can be removed from the steering wheel, and that a guide member is provided on the air bag module or the steering wheel main body for guiding the displacement of the locking body between the lockable status and the removable status.

The air bag module or the steering wheel main body may includes plurality of passage holes and comprise a holding member for holding the locking body, and the guide member may be provided on the holding member.

Further, the guide member may be constituted by a projection or an elongate projection disposed in such a manner as to extend in directions in which the operating portion is operated.

Still further, the locking body may be constituted by a single continuous resilient wire, and the operating portion may be formed by bending the resilient wire into substantially a U-shape, and the projection or elongate projection may be disposed in such a manner as to extend between extreme ends of an operation area of the operating portion.

Furthermore, the locking body may be constituted by a single continuous resilient wire, wherein the operating portion may be formed by bending the resilient wire into substantially a T-shape, and wherein the projection or elongate projection may be disposed in such a manner as to extend along an upper bottom portion of the operating portion formed into substantially a T-shape.

According to the above structure, the engagement between the hook portions and the locking body at the plurality of locking locations is released at one time by only displacing the locking body from the lockable status to there movable status. Moreover, when the locking body is displaced, since the operating portion is guided by the guide member, the looseness of the operating portion is prevented, whereby the locking body can be displaced easily and smoothly. Thus, the air bag module can be mounted on and dismounted from the steering wheel easily and quickly.

Another object of the invention is to provide a steering wheel with an air bag device which facilitates the control of the stroke of a horn switch mechanism and which can reduce restrictions on the design of steering wheels of the type.

With a view to attaining the object, according to a fifth aspect of the invention, there is provided a steering wheel with an air bag device comprising a steering wheel main body, an air bag module having an air bag cover which can oscillate relative to the steering wheel main body and a horn switch mechanism adapted to activate a horn when a pair of contacts disposed spaced away from each other is brought into contact with each other through oscillation of the air bag cover, wherein the horn switch mechanism is provided integrally with the air bag module, and wherein the air bag module is constructed so as to be fixed to the steering main body via a snap-lock mechanism on a bottom or external the thereof.

According to the fifth aspect of the invention, the stroke of the horn switch mechanism can be controlled before the air bag module is assembled to the steering wheel main body by providing the horn switch mechanism integrally with the air bag module. In addition, when so controlling the stroke of the horn switch mechanism, since most of the air bag module is exposed to the outside, even if there are errors in producing and assembling constituent components, the stroke of the horn switch mechanism can easily be corrected to a set value. Additionally, the stationary portion of the air bag module relative to the steering wheel main body can be constructed not to oscillate. Due to this, the air bag module can be fixed to the steering wheel main body in a stable fashion.

In addition, the snap-lock mechanism may include a plurality of pin portions provided on one of a bottom of the air bag module and a confronting surface of the steering wheel main body which confronts the bottom of the air bag module in such a manner as to protrude therefrom, a plurality of passage holes formed in the other of the bottom of the air bag module and the confronting surface of the steering wheel main body which confronts the bottom of the air bag module and a locking body adapted to be brought into engagement with hook portions formed in the pin portions when the pin portions are allowed to pass through the passage holes, respectively.

The air bag module is fixed to the steering wheel main body by allowing the pin portions to pass through the passage holes while pushing back the locking body so that the hook portions of the pin portions are brought into engagement with the locking body, whereby not only can the air bag module be mounted on the steering wheel main body easily but also the air bag module can be fixed to the steering wheel main body in a stable fashion. Moreover, the snap-lock mechanism is constructed simply.

Additionally, the air bag module may include a stationary plate having the plurality of pin portions and a movable plate adapted to oscillate relative to the stationary plate and having the air bag cover mounted thereon, the stationary plate comprising side pieces disposed on both sides of a center line which bisects the steering wheel in a neutral state which are connected to each other.

When the pin portions on the stationary plate are allowed to pass through the passage holes in the steering wheel, both the side pieces are inclined and the pin portions are prevented from being inclined, whereby there occurs no case where the air bag module is supported unstably.

Further, at least part of the stationary plate may be brought into abutment with a stepped portion formed on the steering wheel main body.

Even if the driver of the vehicle strongly presses against the air bag module with the intention of activating the horn, the stationary plate is prevented from being deformed by the pressing force.

Moreover, the stationary plate may have a cross section which is formed into substantially a U-shape.

The strength of the stationary plate is improved, whereby the deformation of the stationary plate is prevented preferably.

Further, at least a pair of pin portion may be provided on each of the side pieces of the stationary plate, and at least three stepped portions may be provided on the steering wheel main body.

The stationary plate may be disposed stably relative to the steering wheel main body.

Still further, the horn switch mechanism may be provided on the stationary plate at a position which is closer to the air bag cover than to a pin support portion which supports the pin portions.

The horn switch mechanism is provided at a position in the vicinity of the height of the center of the gravity of the air bag module. This allows the air bag module to be displaced substantially uniformly as a whole even if the vehicle is suddenly turned or the steering wheel is drastically turned.

Features and advantages of the invention will be evident from the following detailed description of the preferred embodiments described in conjunction with the attached drawings.

DETAILED DESCRIPTION OF THE PREFERRED EMBODIMENTS

Referring to FIGS. 1 to 5, a first embodiment according to the invention will be described below.

Figure 1:
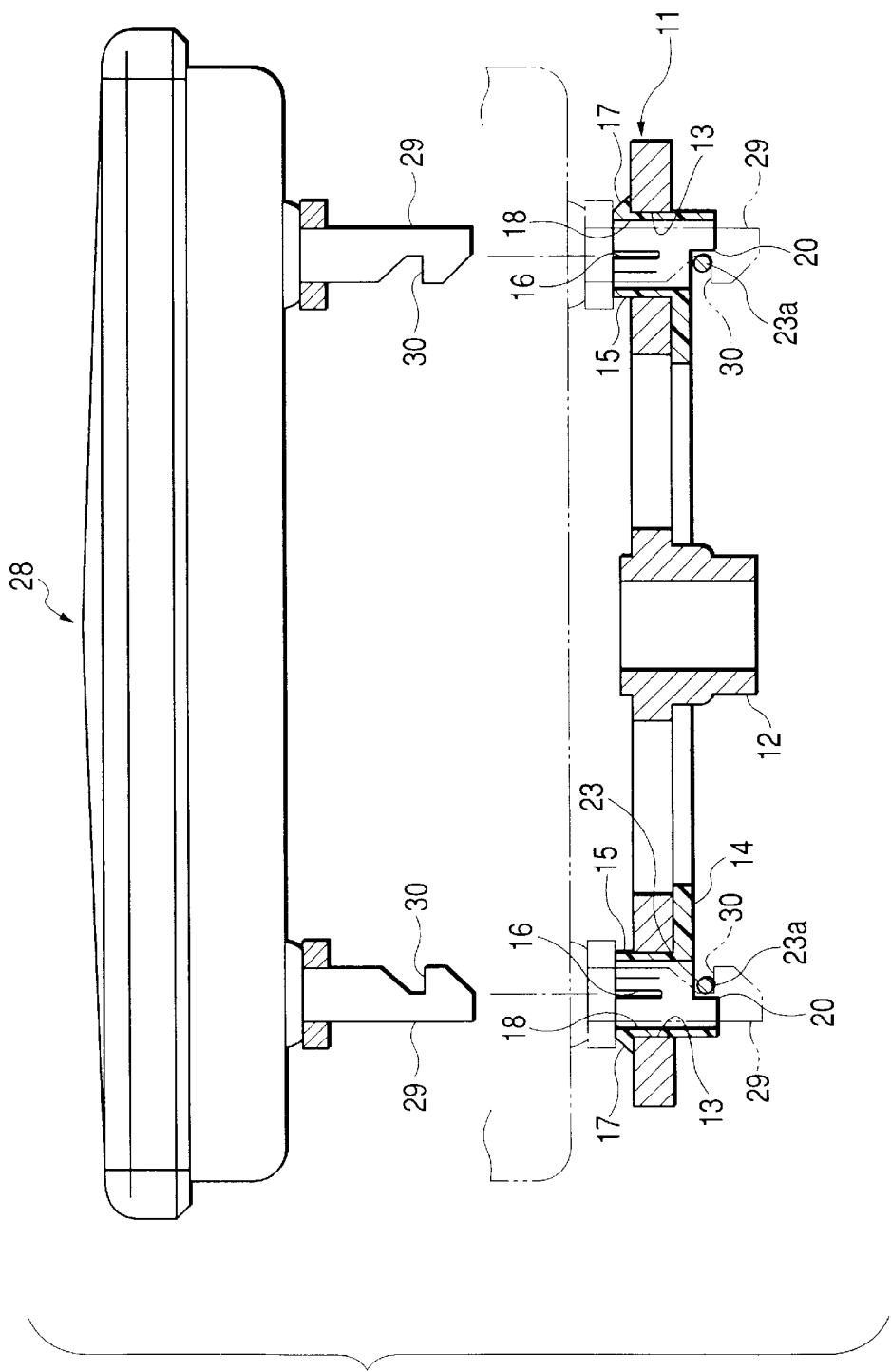
FIG. 1 shows an exploded cross-sectional view of an air bag module mounting structure according to a first embodiment of the invention.

As shown in FIG. 1, a core 11 of a steering wheel is formed from a metallic material, and a boss portion 12 in which a steering shaft is securely fitted and three through holes 13 are formed in the center and outer circumferential edge positions of the core. An annular holding member 14 formed of a synthetic resin is mounted on a lower surface of the core 11 with a plurality of bolts, not shown.

Figure 2:
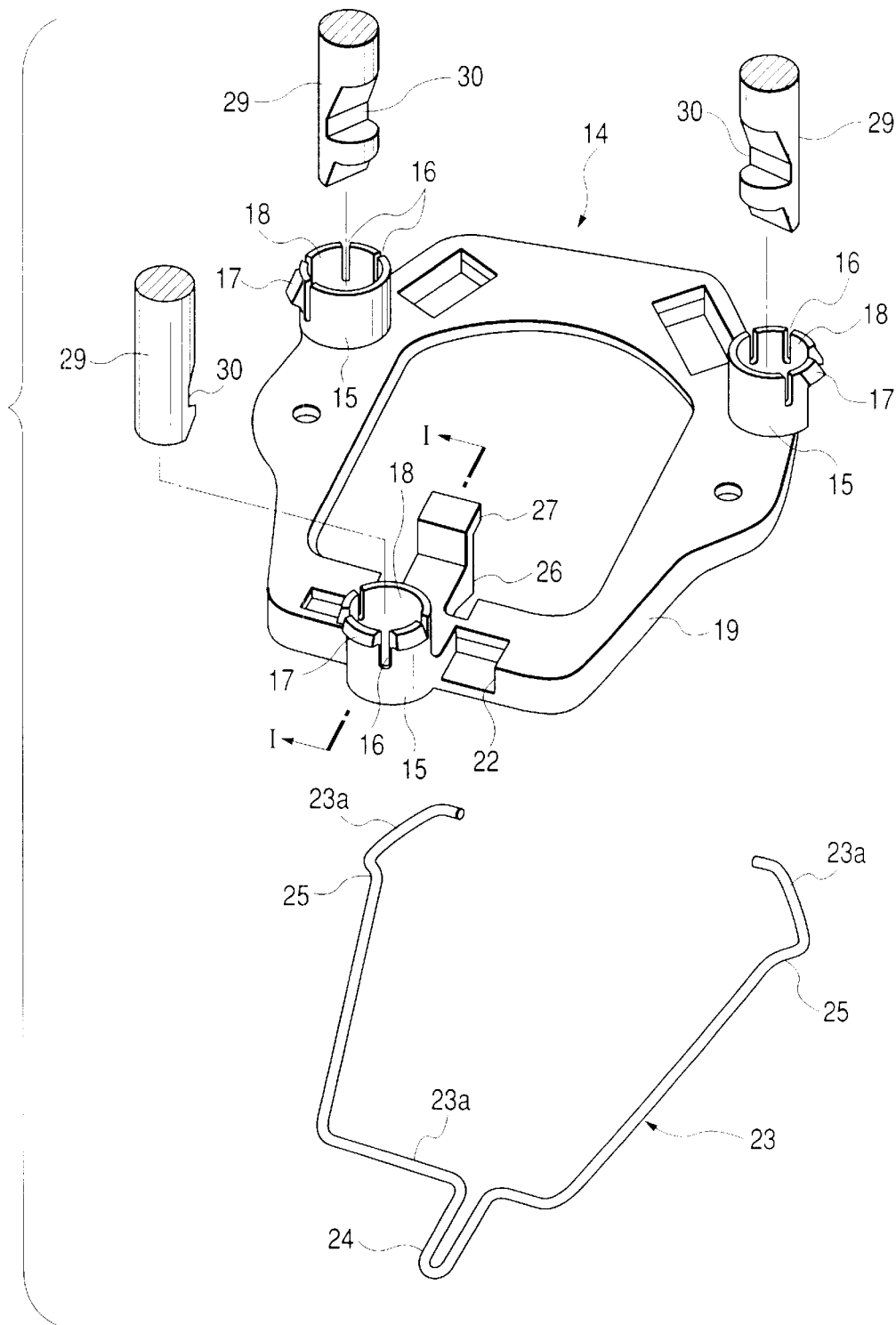
FIG. 2 shows a perspective view showing the mounting structure of FIG. 1 which is disassembled.
Figure 3:
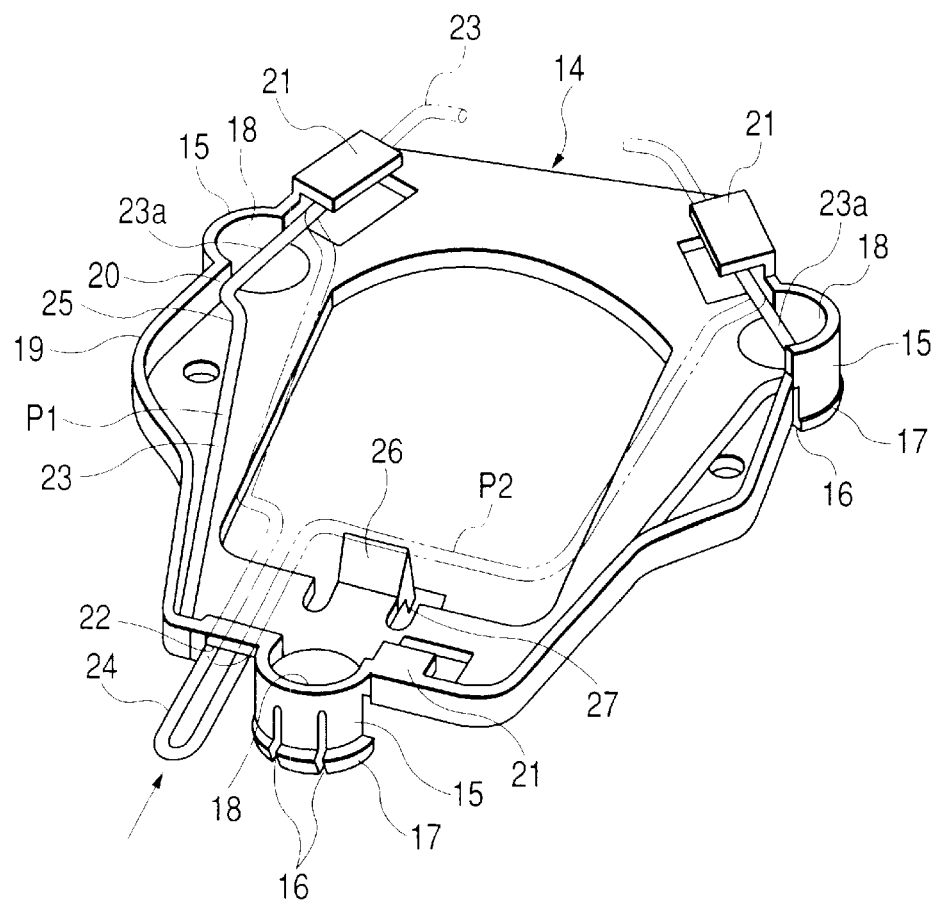
FIG. 3 shows a perspective view showing a holding member shown in FIG. 2 as viewed from a bottom side thereof.

As shown in FIGS. 1 to 3, three cylindrical portions 15 are provided on an upper surface of the holding member 14 at circumferential edge portions in such a manner as to protrude therefrom. A plurality of slits 16 are formed in an upper edge of each of the cylindrical portions and a pawl 17 is provided at a circumferential position around an upper end of each of the cylindrical portions in such a manner as to protrude therefrom, as well. With the holding member 14 being mounted to the core 11, the cylindrical portions 15 are fitted in the through holes 13, respectively, and the pawls 17 are brought into engagement with upper edges of openings in the through holes 13, respectively, wherein three passage holes 18 are formed on the core 11 by the respective cylindrical portions 15.

A rib 19 is formed around an outer circumference of the holding member 14 in such a manner as to protrude from a lower surface thereof, and a holding portion 20 is formed on an internal surface of the rib 19 at a portion confronting each cylindrical portion 15. In addition, a dislocation preventing portion 21 is formed on a lower edge of the rib 19 at a position adjacent to each cylindrical portion 15 in such a manner as to protrude inwardly. Furthermore, an opening 22 is formed in the side of the rib 19 at a position adjacent to the front cylindrical portion 15.

As shown in FIGS. 1 to 3 and 5, a locking wire 23 as a locking body is mounted on a bottom of the holding member 14 in such a manner as to be moved and displaced back and forth. Namely, this locking wire 23 is formed of a single resilient metallic wire which is formed into substantially a trapezoidal ring-like shape which is partially opened. Then, this locking wire 23 is mounted and dispose data lock position P1 constituting a lockable status on the internal surface of the rib 19 on the holding member 14 in a state in which the locking wire is diametrically contracted overall, and the dislocation of the locking wire 23 so disposed is then prevented by the dislocation preventing portions 21. When the locking wire 23 is mounted as described above, the locking wire 23 is brought into contact with the holding portions 20, whereby three locking portions 23a on the locking wire 23 are disposed so as to extend over the passage holes 18, respectively, in a direction in which the locking portions 23a intersect with axes of the passage holes 18 along the rib 19.

An operating portion 24 is formed at a front portion of the locking wire 23 in such a manner as to protrude therefrom, so that the operating portion 24 protrudes forward through the opening 22 when the locking wire 23 is mounted on the holding member 14. In addition, concave recess portions 25 are formed both sides of the locking wire 23 at positions adjacent to the pair of rear locking portions 23a, respectively.

As shown in FIGS. 1 and 2, three pins 29 are provided on a bottom surface of an air bag module 28 that is to be mounted on the core 11 of the steering wheel in such a manner as to protrude therefrom and hook portions 30 are formed in distal ends of the pins 29 in such a manner as to face inwardly. Then, in a case where the air bag module 28 is mounted on the core 11 of the steering wheel, when the pins 29 are allowed to pass through the passage holes 18 in the holding member 14, respectively, the locking wire 23 extending over the respective passage holes 18 is brought into a resilient engagement with the hook portions 30 of the respective pins 29 from inside. As this occurs, the locking wire 23 is separated away from the holding portions 20 and is brought into a press engagement with the hook portions 30 by virtue of its own resiliency, whereby the air bag module 28 is locked and held onto the core 11 at In addition, with the air bag module 28 being so mounted, when the operating portion 24 of the locking wire 23 is operated to be pushed, the locking wire 23 is moved and displaced from the front lock position P1 to a rear release position P2 constituting the removable status. Then, the locking wire 23 is contracted diametrically inwardly at open ends thereof against its resiliency as shown by chain lines in FIG. 5 along internal surfaces of the hook portions 30 in the pair of rear pins 29 and the holding portions 20. As this occurs, the hook portions 30 in the pair of rear pins 29 are separated away from the locking portions 23a and are disposed so as to confront the recess portions 25, and the hook portion 30 in the front pin 29 is also separated away from the locking portion 23a, whereby the engagement between the locking wire 23 and the hook portions 30 at the three locking locations is released at one time.

Figure 4:
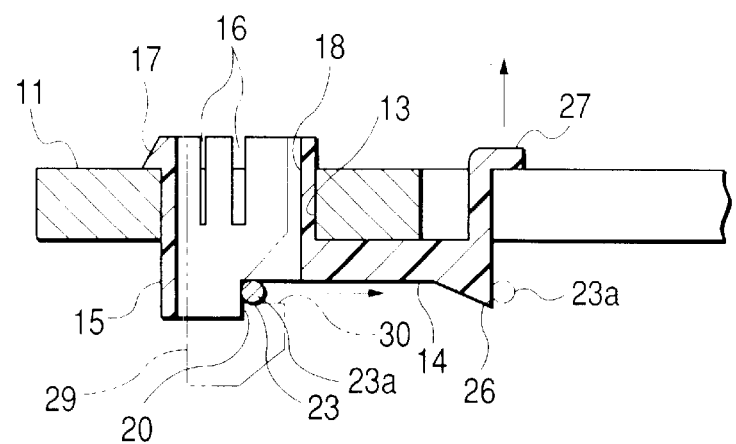
FIG. 4 shows a partially enlarged cross-sectional view taken along the line I—I of FIG. 2.

As shown in FIGS. 2 to 4, an inverted angle-like engagement projection 26 acting as a changeover member is formed on a lower surface of a front internal portion of the holding member 14, and a release portion 27 acting as a return member is formed continuously with an upper portion of the engagement projection 26. As shown by chain lines in FIGS. 3 and 4, the front locking portion 23a of the locking wire 23 is constructed to be brought into engagement with with the engagement projection 26 when the locking wire 23 is moved to the rear release position P2, whereby the locking wire 23 is locked and held at the release position P2.

In addition, when the release portion 27 is operated to be lifted up from that status so that the engagement projection 26 is moved upwardly, the locking portion 23a of the locking wire 23 is release from the engagement with the engagement projection 26. The locking wire 23 is then moved to return from the rear release position P2 to the front lock position P1 by virtue of its own resiliency.

Next, the operation of the air bag module mounting structure which is constructed as described above will be described.

Figure 5:
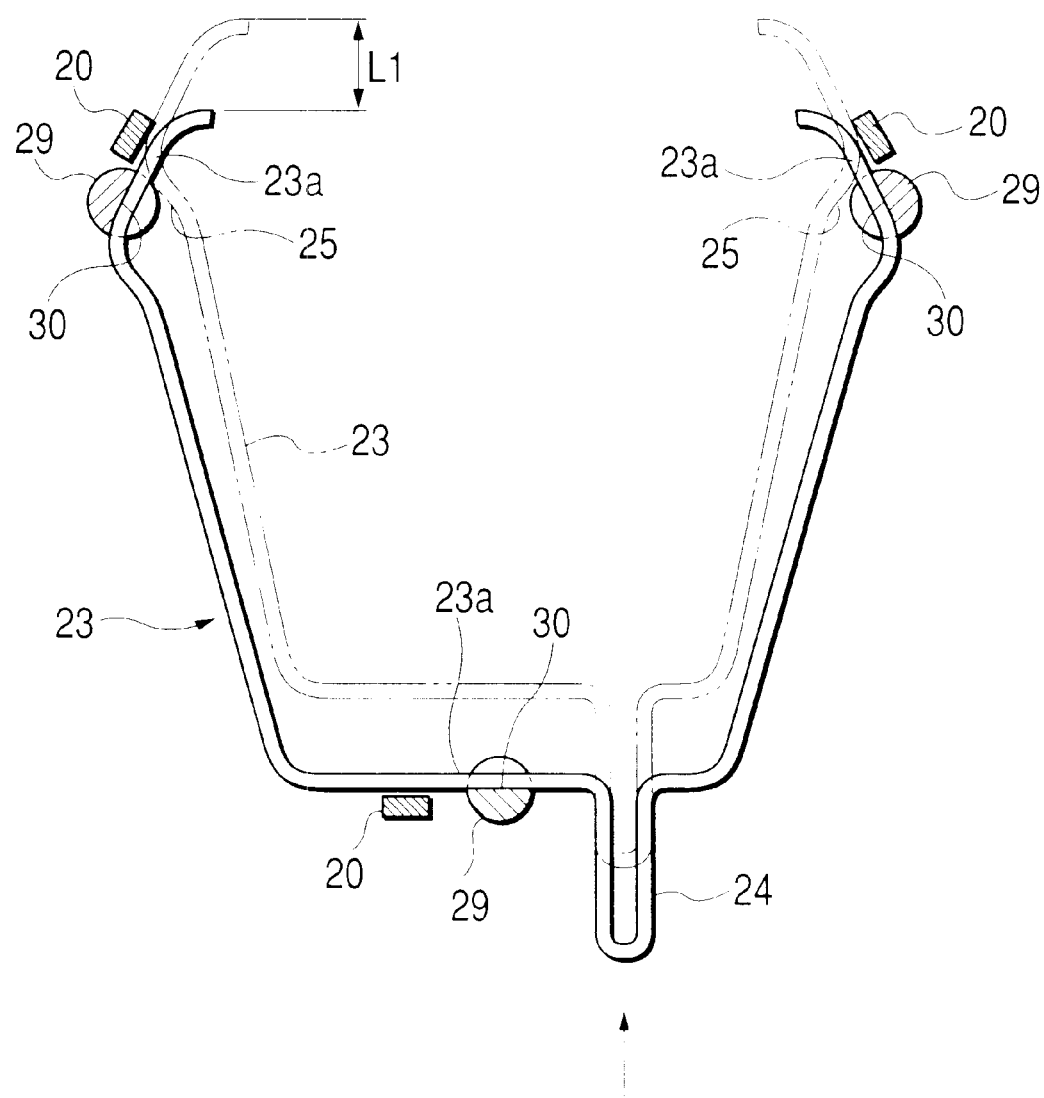
FIG. 5 shows a horizontal cross-sectional view showing a state in which a locking wire is in engagement with pins and an engagement projection.

Firstly, when the air bag module 28 is mounted on the core 11 of the steering wheel, as shown in FIGS. 1 and 5, the locking wire 23 is disposed at the front lock position P1 in the holding member 14. In this state, the three pins 29 provided on the bottom surface of the air bag module 28 so as to protrude therefrom are allowed to pass through the three passage holes 18 in the holding member 14 mounted on the core 11, respectively. Then, the locking wire 23 disposed at the lock position P1 on the lower surface of the holding member 14 is brought into a resilient engagement with the hook portions 30 in the pins 29 from inside within the respective passage holes 18, whereby the air bag module 28 is locked and held to the core 11 at the three locking locations. Thus, the air bag module 28 can be mounted easily and quickly on the steering wheel through a one-touch or single operation.

On the contrary, with the air bag module 28 being so mounted, in the event that the air bag module 28 needs to be removed from the core 11 of the steering wheel for replacement or the like, the operating portion 24 protruding forward from the opening 22 in the holding member 14 is operated to be pushed. In pushing the operating portion 24, the operating portion 24 continues to be operated and pushed until the locking portion 23a of the locking wire 23 rides over the engagement projection 26, whereby the locking wire 23 is changed over from the lock position PI to the release position P2 so as to be disposed at the latter position, the locking wire 23 being thus held to the release position P2.

In this state, the locking wire 23 is contracted diametrically inwardly at the open ends thereof against its own resiliency, whereby the engagement between the locking portions 23a of the locking wire 23 and the hook portions 30 in the pins 29 is released at one time at the three locking locations. In this state, when the air bag module 28 is lifted up, the pins 29 of the air bag module 28 are drawn out of the passage holes 18 in the holding member 14, respectively, whereby the air bag module 28 can be removed from the core 11 of the steering wheel. Thus, since the air bag module 28 is released from the locked state through a one-touch or single operation with the locking wire 23 being held at the release position P2, the air bag module 28 can be removed easily from the core 11 of the steering wheel.

On the contrary, when the air bag module 28 is re-set on the core 11 of the steering wheel, firstly, the release portion 27 is operated to be lifted up so as to move the engagement projection 26 upwardly. Then, the locking portion 23a of the locking wire 23 is released from the engagement with the engagement projection 26, and the locking wire 23 is moved to automatically return from the rear release position P2 to the front lock position P1 by virtue of its own resiliency. In this state, as described above, the pins 29 of the air bag module 28 are allowed to pass through the passage holes 18 in the holding member 14, respectively, so that the locking wire 23 is brought into a resilient engagement with the hook portions 30 in the pins 29.

Thus, according to the embodiment, the following advantages can be obtained.

(1) According to the air bag module mounting structure, the plurality of pins 29 provided on the bottom of the air bag module 28 in such a manner as to protrude therefrom are allowed to pass through the plurality of passage holes 18 formed in the steering wheel, whereby the hook portions 30 formed in the pins 29 are brought into engagement with the locking wire 23 disposed to extend over the passage holes 18, so that the air bag module 28 is locked and held onto the steering wheel. The locking wire 23 is constituted by the single continuous resilient wire, and the engagement of the locking wire 23 with the plurality of hook portions is released at one time by displacing the locking wire 23 to the release position.

Thus, the engagement between the hook portions 30 and the locking wire 23 at the plurality of locking locations can be released at one time by displacing the locking wire 23 to the release position through the one-touch or single operation. Consequently, the air bag module 28 can easily be removed from the steering wheel.

(2) According to the air bag module mounting structure, the recess portions 25 are formed on the locking wire 23 for releasing the engagement of the locking wire 23 with the hook portions 30 when the locking wire 23 is displaced to the release position.

Thus, as shown in FIG. 5, when the locking wire 23 is displaced to the release position over a small displacement distance L1 the recess portions 25 on the locking wire 23 are allowed to confront the hook portions 30, whereby the engagement between the hook portions 30 and the locking wire 23 can easily be released. Consequently, the displacement distance L1 of the locking wire 23 from the lock position to the release position can be made small, whereby the releasing operation can be implemented more easily.

(3) According to the air bag module mounting structure, the operating portion 24 is provided on the locking wire 32 for displacing the locking wire 23 to the release position, whereby the locking wire 23 can easily be displaced to the release position by operating the operating portion 24.

(4) According to the air bag module mounting structure, the holding portions 20 are provided on the holding member 14 mounted on the core 11 of the steering wheel for holding the locking wire 23 at the positions confronting the respective passage holes 18. Then, when the hook portions 30 in the pins 29 are brought into engagement with the locking wire 23, respectively, the locking wire 23 is constructed to be separated away from the holding portions 20.

Thus, the locking wire 23 can securely be held in the mounted status by the holding portions 20 in which the locking wire 23 corresponds to the passage holes 18, respectively. In addition, when the hook portions 30 in the pins 29 are brought into engagement with the locking wire 23, respectively the locking wire is brought into a press engagement with the hook portions 30 by virtue of its own resiliency, whereby the air bag module 28 can rigidly be locked and held onto the steering wheel.

(5) According to the air bag module mounting structure, the pins and passage holes are provided three each. Thus, the air bag module 28 can stably be locked and held onto the steering wheel at the three locking locations.

(6) According to the air bag module mounting structure, the passage holes 18 are formed in the holding member 14 mounted on the core 11 of the steering wheel. Then, the locking wire 23 is mounted on the holding member 14 in such a manner as to be moved thereon between the lock position and the release position.

Thus, the plurality of passage holes 18 can easily be formed in the holding member 14 which is formed from a synthetic resin or the like, and the locking wire 23 can simply be mounted on the holding member 14.

(7) According to the air bag module mounting structure, the locking wire 23 is formed into the ring-like shape which is partially opened and is adapted to be brought into engagement with the hook portions 30 from the inside of the respective pins 29. In addition, the locking wire 23 is diametrically contracted against its own resiliency as the locking wire 23 is moved to the release position, so that the engagement between the locking wire 23 and the respective hook portions 30 is released.

Thus, the locking wire 23 is contracted diametrically inwardly of the respective pins 29 by operating the locking wire so as to move it to the release position, so that the engagement between the locking wire 23 with the respective hook portions 30 can be released.

(8) Further, the locking wire 23 is provided for mounting the pins 29 of the air bag module 28 on the steering wheel when the locking wire 23 is brought into engagement with the hook portions 30 in the pins 29. In addition, the engagement projection 26 is provided for changing over the position of the locking wire 23 between the lock position P1 where the air bag module 28 can be locked to the steering wheel and the release position P2 where the air bag module 28 can be removed from the steering wheel so that the locking wire 23 can be disposed at the respective positions.

Thus, when the air bag module 28 is removed from the core 11 of the steering wheel the position of the locking wire 23 can be changed over to the release position P2 so that the locking wire 23 can be disposed thereat, whereby the abrupt return of the locking wire 23 to the lock position P1 can be prevented, the removal of the air bag module 28 being thereby facilitated.

(9) According to the air bag module mounting structure, the engagement projection 26 is constructed to hold the locking wire 23 at the release position P2 when the air bag module 28 is removed from the core 11 of the steering wheel.

Thus, it can be prevented in a more ensured fashion that the position of the locking wire 23 is abruptly changed over to the lock position P1 whereby the locking wire 23 is disposed thereat while air bag module removing work is being carried out, thereby making it possible to perform the air bag module removing work more easily and quickly.

(10) According to the air bag module mounting structure, the locking wire 23 is constituted by the single continuous wire formed into substantially the trapezoidal ring-like shape which is partially opened.

Namely, the three pins 29 are held on the core 11 of the steering wheel with the single locking wire 23. This can obviate the necessity of preparing a plurality of locking wires 23, leading to a reduction in the number of parts. Moreover, when the air bag module 28 is removed from the core 11, the position of the single locking wire 23 only has to be changed over to the release position P2 so that the locking wire 23 can be disposed thereat, thereby making it possible to perform the air bag module removing work more quickly and easily.

(11) According to the air bag module mounting structure, when the locking wire 23 is disposed at the release position P2 the engagement of the locking wire 23 with all the hook portions 30 of the pins 29 is released at one time.

Thus, the engagement between the locking wire 23 and all the hook portions 30 is released at one time through such a simple operation as push the operating portion 24 to change over the position of the locking wire 23 to the release position P2 so that the locking wire 23 is disposed thereat, whereby the air bag module removing work can be performed more quickly and easily.

(12) According to the air bag module mounting structure, the release portion 27 for returning the locking wire 23 disposed at the release position P2 to the lock position P1 is continuously connected to the engagement projection 26.

Thus, the locking wire 23 can automatically be returned to the lock position P1 by its own resiliency by operating the release portion 27 to lift it. Consequently, when the air bag module 28 is mounted again on the core 11 of the steering wheel mounting work of the air bag module 28 can be performed more quickly and easily.

(13) In the air bag module mounting structure the release portion 27 is operated to be lifted up so as to move the engagement projection 26 upwardly. Then, the locking portion 23a of the locking wire 23 is released from the engagement with the engagement projection 26, and the locking wire 23 is moved to automatically return from the rear release position P2 to the front lock position P1 by virtue of its own resiliency.

Accordingly, by lifting up the release portion 27, the locking wire 23 is automatically returned to the front lock position P1 by virtue of its own resiliency. Thus, when the air bag module 28 is mounted again on the core 11 of the steering wheel, work for mounting the air bag module 28 can be carried out quickly and easily.

(14) According to the air bag module mounting structure, the passage holes 18 are formed in the holding member 14 mounted on the core 11 of the steering wheel. In addition, the locking wire 23 is mounted on the holding member 14 in such a manner as to be moved between the lock position P1 and the release position P2.

Thus, the three passage holes 18, the engagement projection 26 and the release portion 27 can easily be formed in and on the holding member 14 formed of synthetic resin. In addition, the locking wire 23 can easily be mounted on the core 11 of the steering wheel via the holding member 14.

Next, a second embodiment of the invention will be described by mainly describing portions which are different from the first embodiment.

In an air bag module mounting structure according to the second embodiment, as shown in FIGS. 6 to 9, a locking wire 41 is formed into substantially a circular ring-like shape which is partially opened. This locking wire 41 is mounted and disposed inside a rib 19 on a holding member 14 in a state in which the locking wire 41 is diametrically contracted overall and is prevented from being dislocated by dislocation preventing portions 21. In addition, open ends of the locking wire 41 are folded back toward an outer circumferential side, and locking portions 41a are formed at such three locations as those folded back portions and a position along the front edge of the locking wire 41. With the locking wire 41 being so mounted, when the holding portions 20 are brought into contact with these locking portions 41a the locking portions 41a are disposed so as to extend over passage holes 18, respectively, in a direction in which the locking portions 41a intersect with axes of the passage holes 18 along the rib 19.

An operating portion 42 is formed at a front portion of the locking wire 41 in such a manner as to protrude therefrom, and this operating portion 42 is constructed to protrude forward through the opening 22 when the locking wire 41 is mounted on the holding member 14. In addition, a recess portion 25 is provided on the locking wire at a position adjacent to one side of each locking portion 41a. Namely, a concave recess portion 25 is formed adjacent to the front locking portion 41a. A space-like recess portion 25 is formed adjacent to the left rear locking portion 41a at a rear end of the folded back portion. A space-like recess portion 25 is formed adjacent to the right rear locking portion 41a at a front end of the folded back portion.

Figure 6:
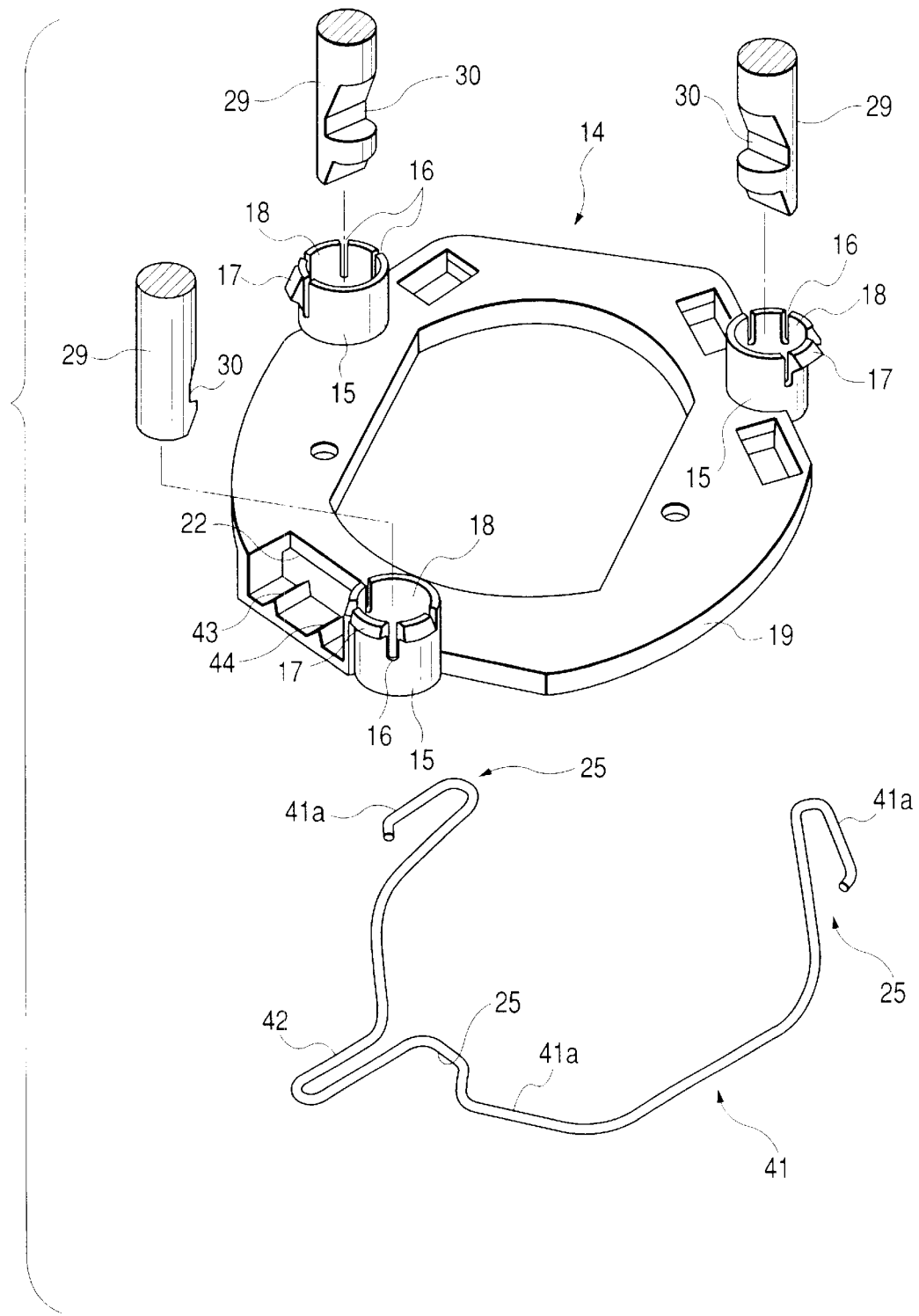
FIG. 6 shows an exploded perspective view of an air bag module mounting structure according to a second embodiment of the invention.
Figure 7:
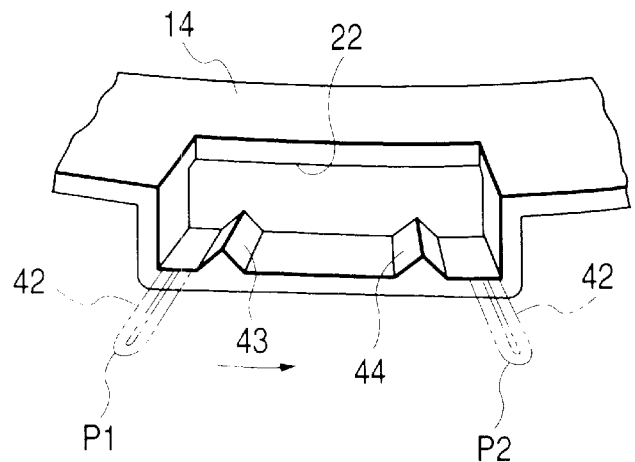
FIG. 7 shows a partial perspective view showing an opening in a holding member shown in FIG. 6 by enlarging the opening.
Figure 8:
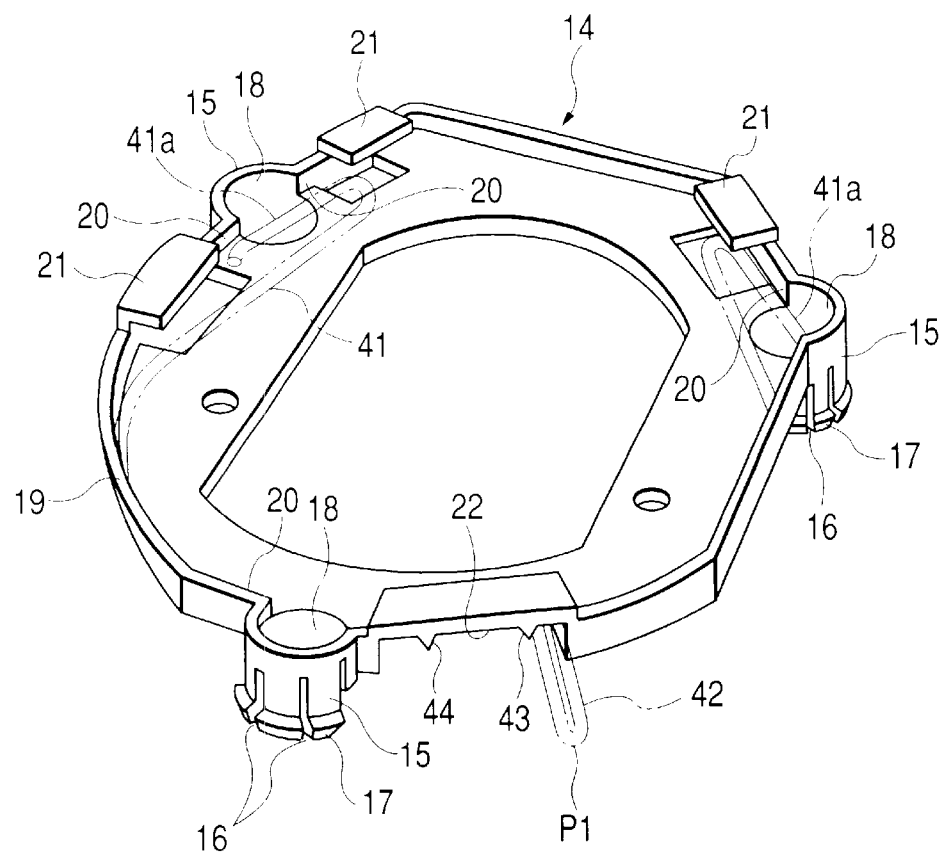
FIG. 8 shows a perspective view showing the holding member shown in FIG. 6 as viewed from a bottom side thereof.

As shown in FIGS. 6 to 8, elongate engagement projections 43, 44 acting as a pair of engagement portions are formed on an upper surface of the opening 22 of the holding member 14 at a predetermined interval. When the locking wire 41 is disposed at the lock portion P1 at one side of the opening 22, the operating portion 42 is in engagement with the elongate engagement projection 43, whereby the locking wire 41 is held at the lock position P1. Additionally, when the operating portion 42 is operated to be rotated in a direction indicated by an arrow shown in FIGS. 7 and 9A so that the locking wire 41 is rotated from the lock position P1 (refer to FIGS. 7 and 9A) to the release position P2 (refer to FIGS. 7 and 9B) on the other side of the opening 22, the operating portion 42 is then brought into engagement with the elongate engagement portion 44, whereby the locking wire 41 is held at the release position P2. Thus, the changeover member is constituted by the operating portion 42 of the locking wire 41 and the pair of elongate engagement projections 43, 44.

With the air bag module 28 being mounted on the core 11, when the locking wire 41 is rotated from the lock position P1 to the release position P2, hook portions 30 in respective pins 29 are separated away from the locking portions 41a to be disposed so as to confront the recess portions 25, whereby the engagement between the locking portions 41a of the locking wire 41 and the hook portions 30 is released at one time at the three locking locations.

Next, the operation of the air bag module mounting structure constructed as described above will be described.

Firstly, in a case where the air bag module 28 is mounted on the core 11 of the steering wheel, the locking wire 41 is disposed at the lock position P1 on the one side of the opening 22 in the holding member 14 so that the operating portion 42 of the locking wire 41 is brought into engagement with the elongate engagement projection 43. In this state, as in the case with the first embodiment, the three pins 29 formed on the bottom surface of the air bag module 28 in such a manner as to protrude therefrom are allowed to pass through the three passage holes 18 in the holding member 41, respectively, whereby the hook portions 30 in the pins 29 are brought into a resilient engagement with the locking portions 41a of the locking wire 41.

On the contrary, in a case where the air bag module 28 is required to be removed from the core 11 of the steering wheel, the operating portion 42 of the locking wire 41 protruding forward from the opening 22 in the holding member 14 is rotated in a direction indicated by an arrow shown in FIG. 7. As this occurs, the operating portion 42 of the locking wire 41 is operated to be rotated until the operating portion 42 rides over the elongate engagement projection 43 and the elongate engagement projection 44, whereby the operating portion 42 and the elongate engagement projection 44 are brought into engagement with each other, and the position of the locking wire 41 is changed over from the lock position P1 to the release position P2, the locking wire 41 being held at the release position P2.

Figure 9A:
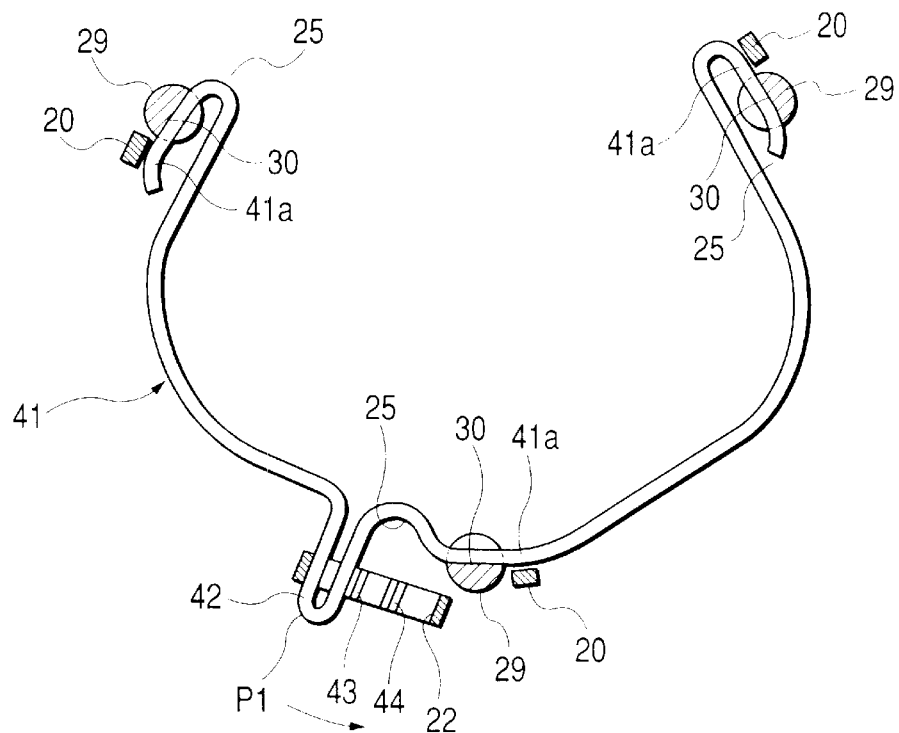
FIG. 9A shows a horizontal cross-sectional view showing a state in which a locking wire and pins shown in FIG. 6 are positioned when the locking wire is at a lock position.
Figure 9B:
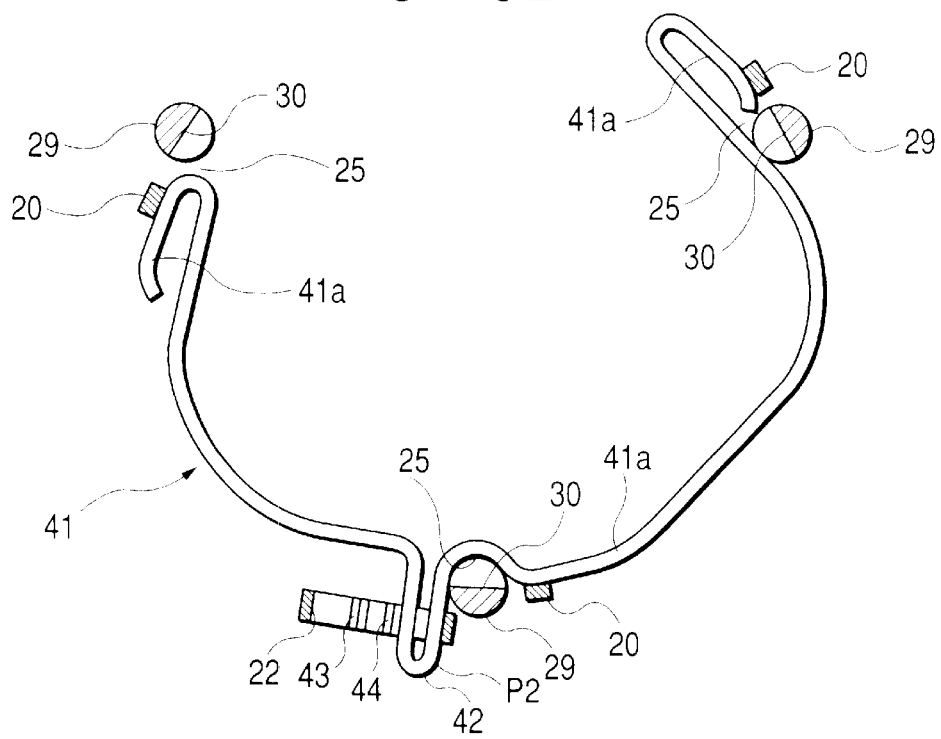
FIG. 9B shows a horizontal cross-sectional view showing a state in which the locking wire and pins shown in FIG. 6 are positioned when the locking wire is at a release position.

In this state, as shown in FIG. 9B, the hook portions 30 in the pins 29 are separated away from the locking portions 41a to be disposed so as to confront the recess portions 25, respectively, at the respective locking locations, whereby the engagement between the locking portions 41a of the locking wire 41 and the hook portions 30 in the pins 29 is released at one time at those three locking locations. Thus, similarly to the first embodiment, the air bag module 28 can easily be removed from the core 11 of the steering wheel by releasing the air bag module 28 from the locked state through a one-touch or single operation.

On the contrary, when the air bag module 28 is re-mounted on the core 11 of the steering wheel, firstly, the operating portion 42 of the locking wire 41 is operated to be rotated in an opposite direction to that used at the time of the aforesaid removing operation. When the operating portion 42 is rotated in such a manner as to ride over the elongate engagement projection 44 and then the elongate engagement projection 43, the operating portion 42 is brought into engagement with the elongate engagement projection 43, whereby the locking wire 41 is held at the lock position P1. In this state, as has been described above, the pins 29 on the air bag module 28 are allowed to pass through the passage holes 18 in the holding member 14, respectively, and the locking wire 41 and the hook portions 30 in the pins 29 are brought into a resilient engagement with each other.

Consequently, according to the embodiment, in addition to the advantages obtained in the first embodiment, the following advantages can be obtained.

(15) According to the air bag module mounting structure, the operating portion 42 used in rotating the locking wire 41 plays part of a role in holding the locking wire 41 at the lock position P1 or the release position P2. Thus, the locking wire 41 is changed over between the lock position P1 and the release position P2 so as to be disposed at the respective positions through the simple construction without increasing the number of parts.

(16) According to the air bag module mounting structure, the locking wire 41 is changed over to the lock position P1 or the release position P2 so as to be disposed at the lock position P1 or the release position P2 by bringing the operating portion 42 of the locking wire 41 into either of the pair of elongate engagement projections 43, 44 formed in the holding member 14. Thus, the locking wire 41 can securely be held at the lock position P1 or the release position P2 as required.

Next, a third embodiment of the invention will be described by mainly describing portions which are different from the first embodiment.

Figure 10:
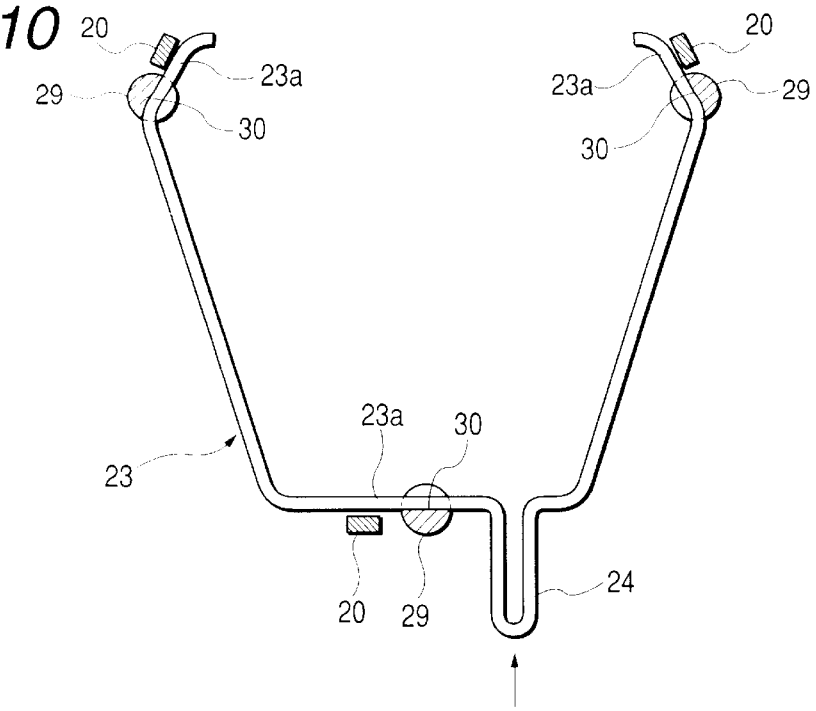
FIG. 10 shows a horizontal cross-sectional view showing a locking wire and pins, according to a third embodiment.

In an air bag module mounting structure according to the third embodiment, as shown in FIG. 10, a locking wire 23 is, as in the case with the first embodiment, formed into substantially a trapezoidal ring-like shape with the concave recess portions 25 being omitted from the sides of the locking wire. Consequently, in this embodiment, when compared with the first embodiment, the displacement distance L1 covered by the locking wire 23 when it is moved from a lock position to the release position becomes longer.

Consequently, according to this embodiment, the following advantages can be obtained.

According to this air bag module mounting structure, the recess portions 25 are omitted from the locking wire 23. Due to this, the configuration of the locking wire 23 can be simplified, whereby the overall structure of the mounting structure can be simplified, as well.

Next, a fourth embodiment of the invention will be described by mainly describing portions which are different from the first embodiment.

Figure 11:
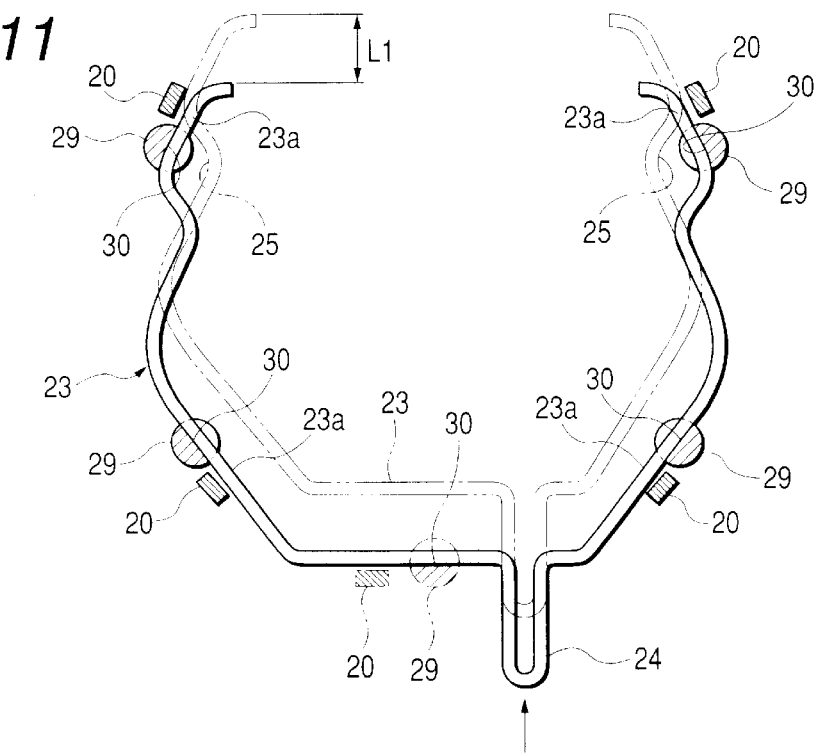
FIG. 11 shows a horizontal cross-sectional view showing a locking wire and pins, according to a fourth embodiment.

In an air bag module mounting structure according to the fourth embodiment, as shown in FIG. 11, the locking wire 23 is formed into substantially a circular ring-like shape and locking portions 23a are formed at four locations along the outer circumference of the locking wire 23. In addition, four passage holes 18 are formed in a holding member 14 mounted on a core 11 of a steering wheel in such a manner as to confront respective locking portions 23a of the locking wire 23. Furthermore, four pins 29 are provided on a bottom of the air bag module 28 in such a manner as to protrude therefrom so that the pins 29 confront the passage holes 18 formed in the holding member 14, respectively.

Then, when the pins 29 are allowed to pass through the passage holes 18 the hook portions 30 in the pins 29 are brought into engagement with the locking wire 23, respectively, whereby the air bag module 28 is locked and held onto the core 11 of the steering wheel at the four locking locations. In addition, when the locking wire 23 is moved from the lock position to the release position the locking wire is contracted diametrically inwardly, whereby the engagement between the locking wire 23 and the hook portions 30 at the four locking locations is released at one time.

Thus, according to the embodiment, advantages substantially similar to the above set forth can be obtained.

Next, a fifth embodiment according to the invention will be described by describing mainly portions which are different from the fifth embodiment.

Figure 12:
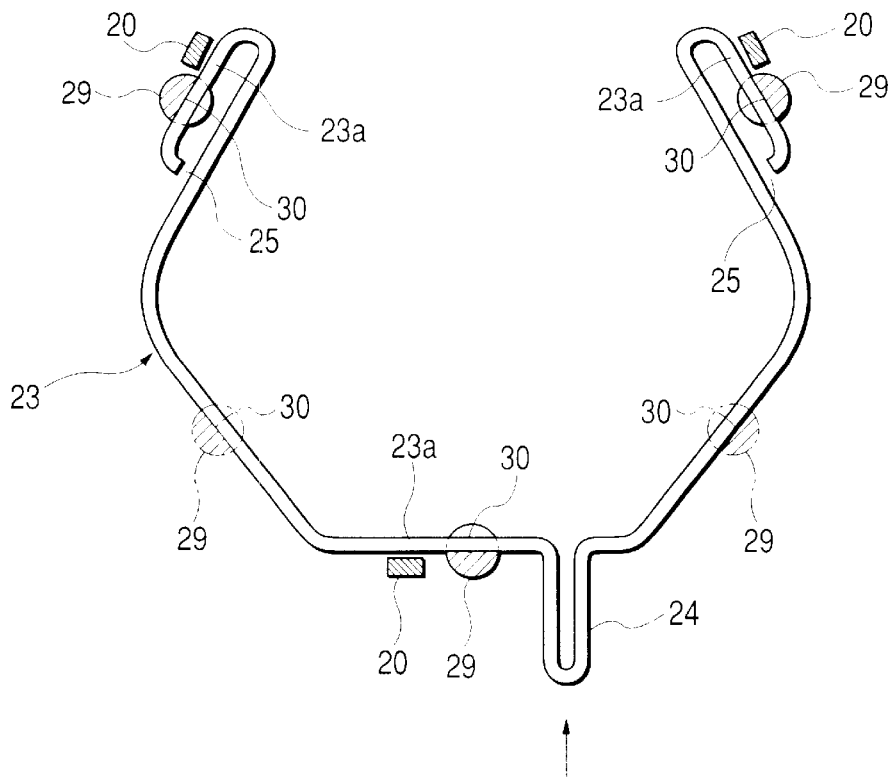
FIG. 12 shows a horizontal cross-sectional view showing a locking wire and pins, according to a fifth embodiment.

In an air bag module mounting structure according to a fifth embodiment, as shown in FIG. 12, a locking wire 23 is formed into substantially a circular ring-like shape which is similar to that according to the third embodiment. In addition, folded back portions are formed at ends of the locking wire 23 on a side thereof where an opening is formed in such a manner as to face in outer circumferential directions, and three locking portions 23a are formed at the folded back portions and at a position along a front edge of the locking wire 23. In addition, in this embodiment, front edges of the folded back portions constitute recess portions 25, respectively.

Thus, according to the embodiment, advantages substantially similar to above set forth can be obtained.

Next, a sixth embodiment according to the invention will be described by describing mainly portions which are different from the first embodiment.

Figure 13:
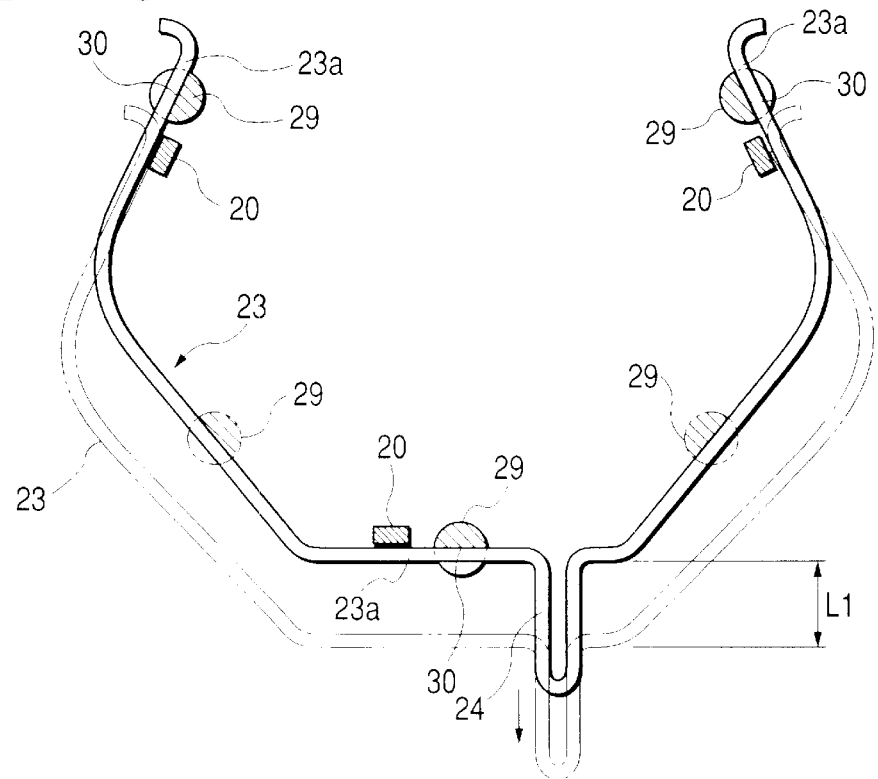
FIG. 13 shows a horizontal cross-sectional view showing a locking wire and pins, according to a sixth embodiment.

In the sixth embodiment, as shown in FIG. 13, a locking wire 23 is formed into substantially a circular ring-like shape, and three locking portions 23a are formed at a position along a front edge and at rear ends of the locking wire 23. In addition, hook portions 30 are formed in distal ends of three pins 29 which are provided on a bottom of an air bag module 28 in such a manner as to protrude therefrom, the hook portions 30 being allowed to face outwardly. Then, the locking wire 23 is constructed to be brought into engagement with the hook portions 30 from the outside of the pins 29, respectively, at locking portions 23a, respectively.

Furthermore, when the air bag module 28 is removed from a core 11 of the steering wheel, an operating portion 24 of the locking wire 23 is operated so as to be drawn out forward so that the locking wire 23 is moved to a front release position, whereby the locking wire 23 is diametrically expanded, the engagement between the locking wire 23 and the hook portions 30 being thus released at one time at three locking locations.

Thus, according to this embodiment, in addition to the advantages of the first embodiment, the following advantages can be obtained.

According to this air bag module mounting structure, the locking wire 23 is formed into substantially a circular ring-like shape which is partially opened and is brought into engagement with the hook portion 30 from the outside of the respective pins 29. In addition, the locking wire 23 is diametrically expanded against its own resiliency as the locking wire 23 is moved to the release position, whereby the engagement between the locking wire 23 and the respective hook portions 30 is released.

Thus, when the locking wire 23 is operated so as to be moved to the release position the locking wire 23 is expanded diametrically outwardly, whereby the engagement between the locking wire 23 and the respective hook portions 30 can easily be released.

Next, a seventh embodiment of the invention will be described by describing mainly portions which are different from the first embodiment.

Figure 14:
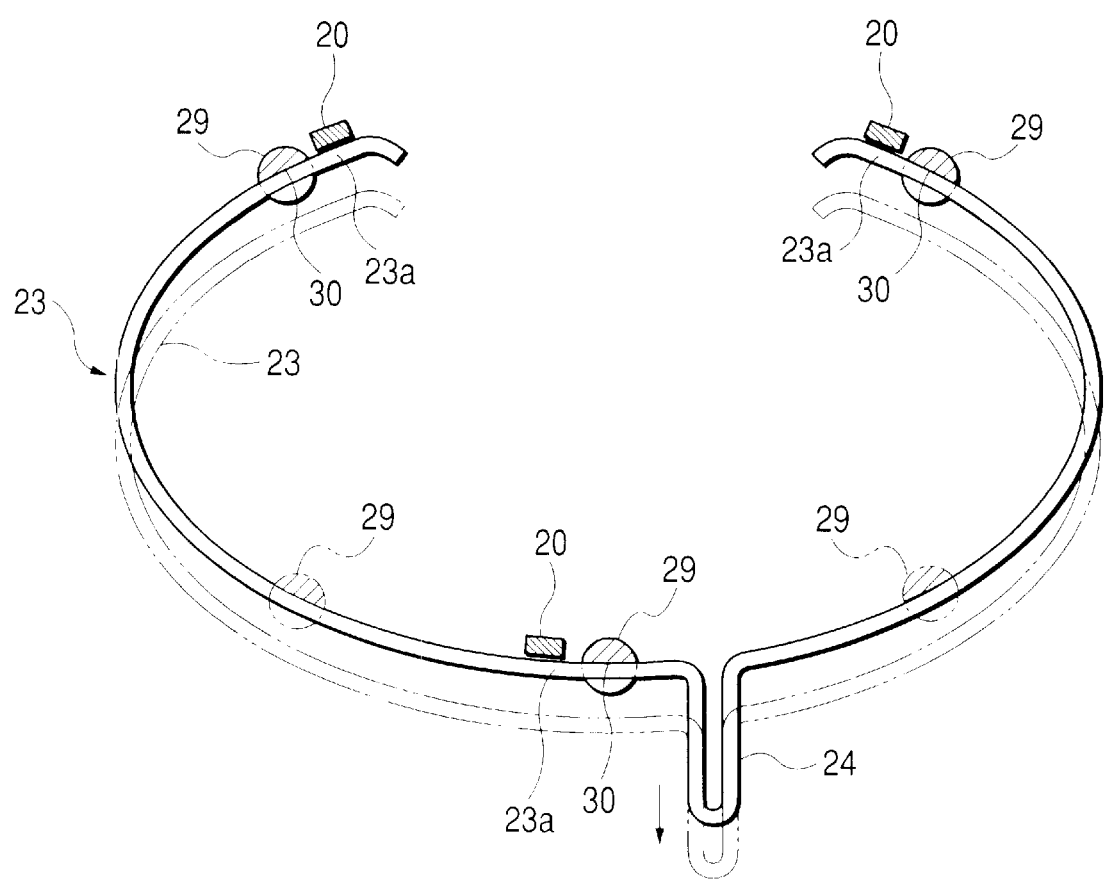
FIG. 14 shows a horizontal cross-sectional view showing a locking wire and pins, according to a seventh embodiment.

In this seventh embodiment, as shown in FIG. 14, the locking wire 23 is formed into substantially an oval ring-like shape which is partially opened, and three locking portions 23a are formed in the vicinity of ends of the opening and a position along a front edge of the locking wire 23. The pair of rear locking portions 23a at the rear are brought into engagement with hook portions 30 from the inside of pins 29, whereas the front locking portion 23 is brought into engagement with the hook portions 30 from the outside of the pins 29.

Thus, in this embodiment, when the locking wire 23 is translated to the forward release position the locking portions 23a are separated away from the hook portions 30 at the three locking locations, whereby the engagement between the locking portions 23 and the hook portions 30 is released at one time.

Consequently, according to this embodiment, advantages substantially similar to the above set forth can be obtained.

Next, an eighth embodiment of the invention will be described by describing mainly portions which are different from the first embodiment.

In the eighth embodiment, as shown in FIG. 15, a pair of locking portions 23a is formed on sides of a locking wire 23 at the front thereof, and another pair of locking portions 23a is formed at folded back portions on sides of the locking wire 23 at the rear thereof. In addition, a concave recess portion 25 is formed adjacent to each of the front recess portions 23a, while a space-like recess portion 25 is formed adjacent to each of the rear locking portions 23a. On the other hand, four passage holes 18 are formed in a holding member 14 mounted on a core 11 of a steering wheel in such a manner as to confront the locking portions 23a on the locking wire 23, respectively. Furthermore, four pins 29 are provided on a bottom surface of an air bag module 28 in such a manner as to confront the passage holes 18 in the holding member 14, respectively.

Figure 15A:
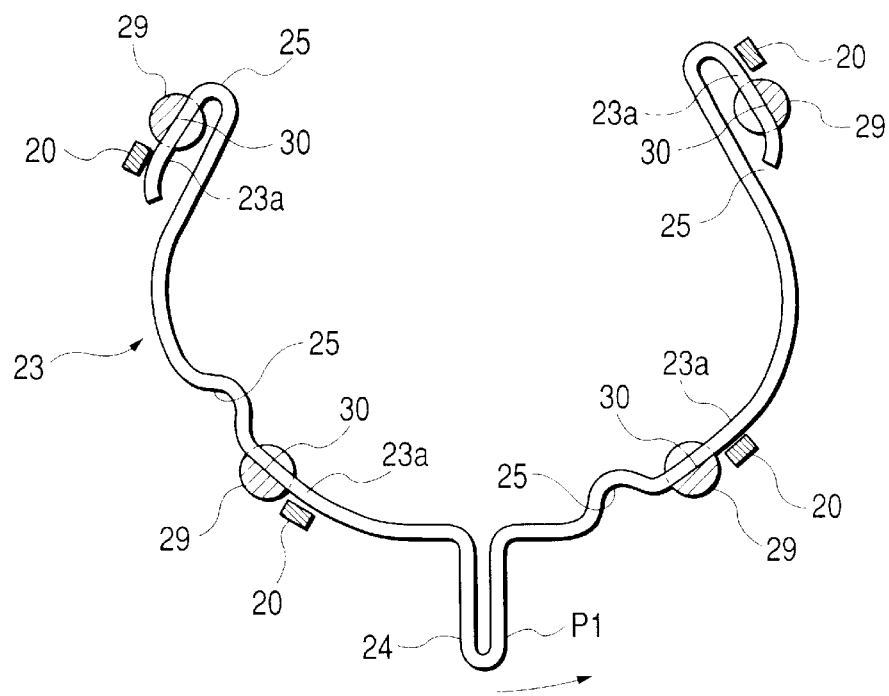
FIG. 15A shows a horizontal cross-sectional view showing a positional relationship between a locking wire and pins with the locking wire being located at a lock position, according to an eighth embodiment.
Figure 15B:
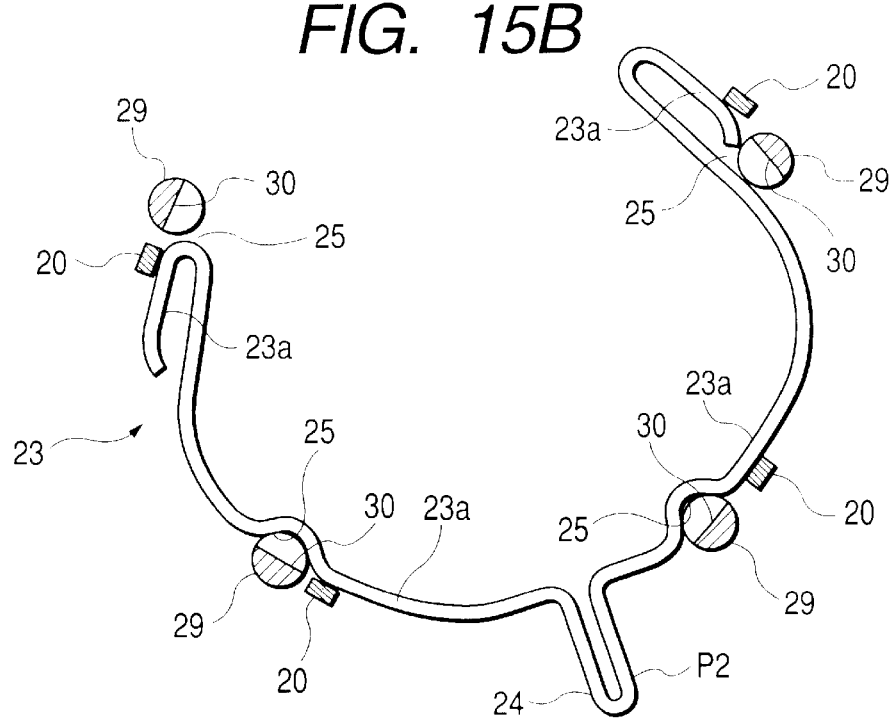
FIG. 15B shows a horizontal cross-sectional view showing a positional relationship between the locking wire and the pins with the locking wire being located at a release position, according to the eighth embodiment.

Then, when the pins 29 are allowed to pass through the passage holes 18 hook portions 30 in the pins 29 are brought into engagement with the locking portions 23a on the locking wire 23, respectively, whereby the air bag module 28 is constructed to be locked and held onto the core 11 of the steering wheel at the four locking locations (refer to FIG. 15A). In addition, when the locking wire 23 is rotated from a lock position P1 to a release position P2, the engagement between the locking portions 23a on the locking wire 23 and the hook portions 30 is released at the four locking locations at one time (refer to FIG. 15B).

Thus, according to the embodiment, advantages substantially similar to above set forth in the first embodiment can be obtained.

Next, a ninth embodiment of the invention will be described by describing mainly portions which are different from the first embodiment.

Figure 16A:
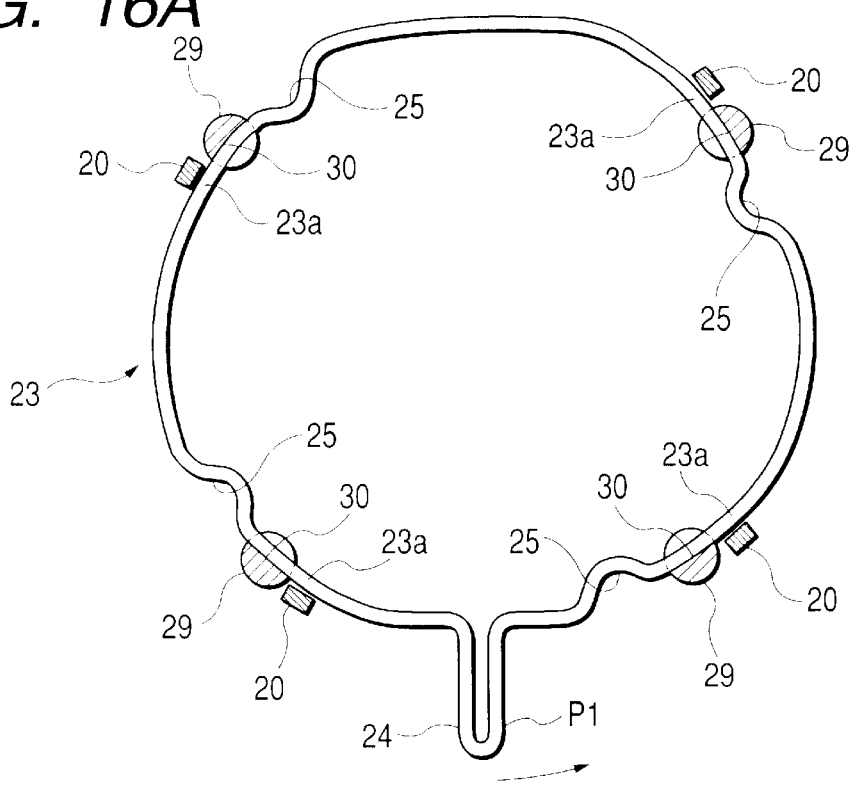
FIG. 16A shows a horizontal cross-sectional view showing a positional relationship between a locking wire and pins with the locking wire being located at a lock position, according to a ninth embodiment.

In the ninth embodiment, as shown in FIG. 16, a locking wire 23 is formed into substantially a end less circular ring-like shape having no opening there along, and locking portions 23a are formed at four locations along an outer circumference of the locking wire 23. In addition, a concave recess portion 25 is formed adjacent to each of the locking portions 23a on the locking wire 23. Furthermore, similarly to the second embodiment, four passage holes 18 are formed in a holding member 14, and four pins 29 are provided on a bottom surface of an air bag module 28 in such a manner as to protrude therefrom.

Figure 16B:
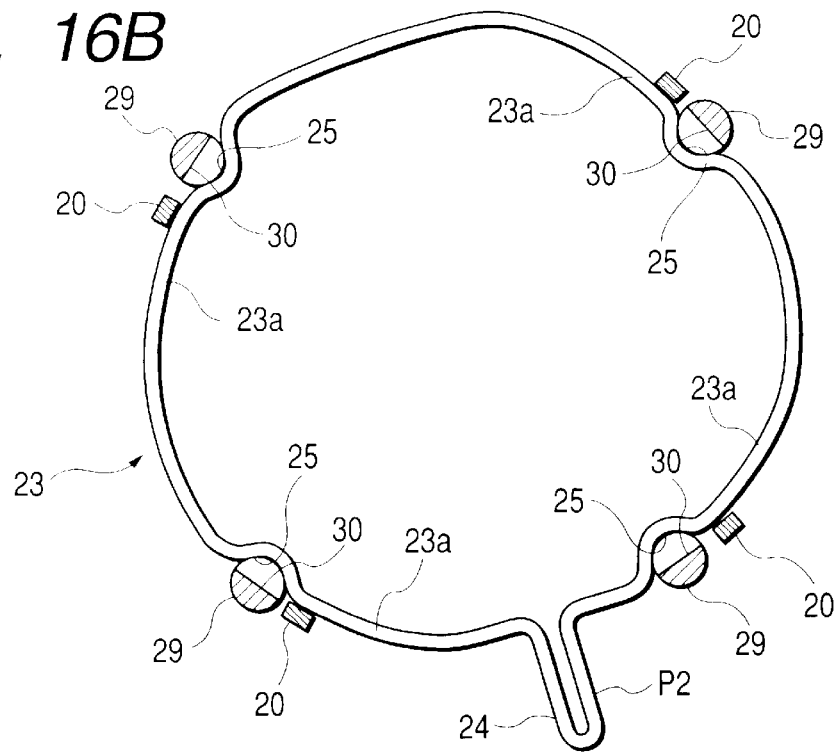
FIG. 16B shows a horizontal cross-sectional view showing a positional relationship between the locking wire and the pins with the locking wire being located at a release position, according to the ninth embodiment.

Then, similarly to the eighth embodiment, the air bag module 28 is adapted to be locked and held onto a core 11 of a steering wheel at four locking locations (refer to FIG. 16A) In addition, the engagement of the locking wire 23 and hook portions 30 is released at the four locking locations at one time by rotating the locking wire 23 to a release position P2 (refer to FIG. 16B).

Thus, according to the embodiment, advantages substantially similar to above set forth in the first embodiment can be obtained.

Figure 17:
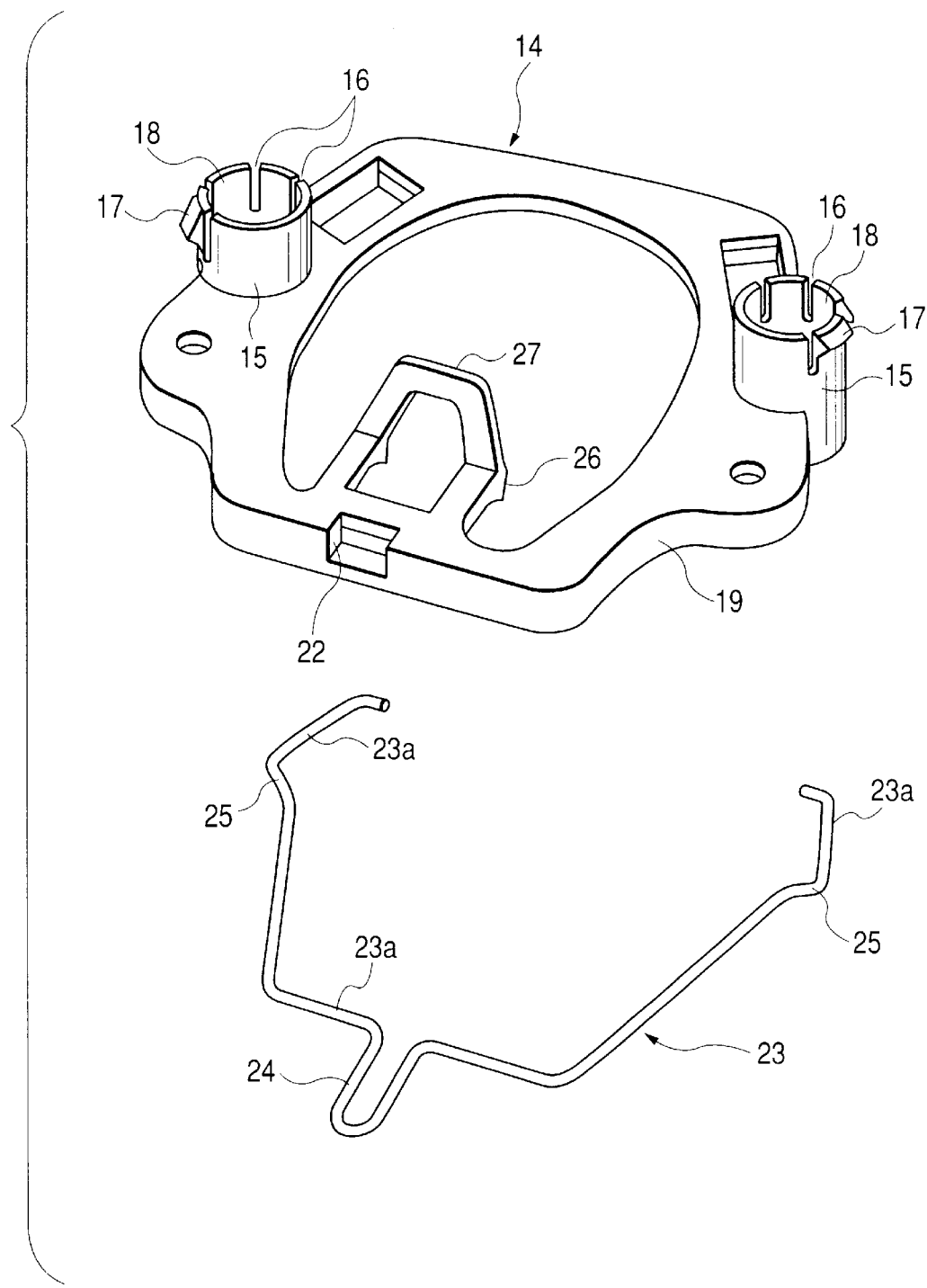
FIG. 17 shows an exploded perspective view of an air bag module mounting structure according to a tenth embodiment of the invention.
Figure 18:
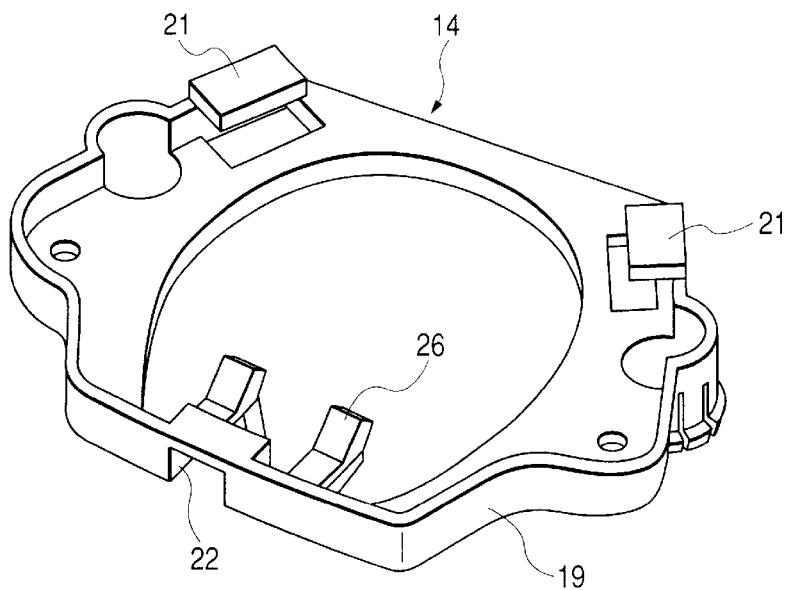
FIG. 18 shows a perspective view showing the holding member shown in FIG. 17 as viewed from a bottom side thereof.

FIGS. 17 and 18 show a tenth embodiment of the present invention. This embodiment is applied to the air bag module in which two pins 29 are provided on the bottom thereof.

Figure 19A:
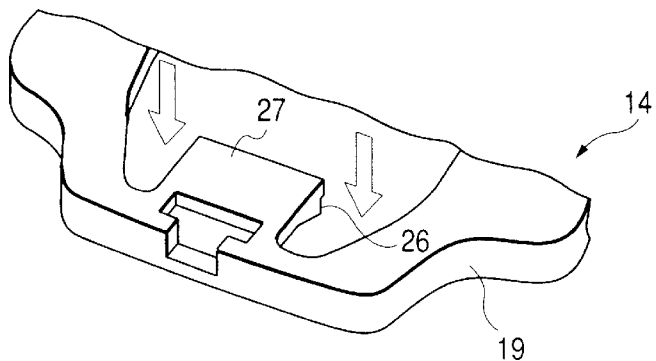
FIGS. 19A and 19B show a partial perspective view showing the holding member according to an eleventh embodiment.
Figure 19B:
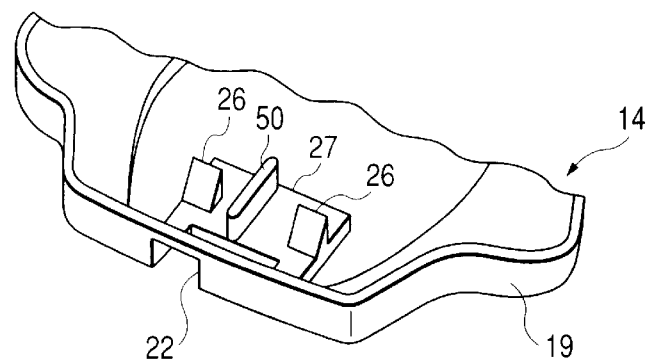

FIGS. 19A and 19B show an eleventh embodiment of the present invention. This embodiment is also used to be applied to the air bag module having two pins 29 as similar to the tenth embodiment. In this embodiment, a wire guide rib 50 is provided between two engagement projections 26 formed in the release portion 27 acting as return means.

A twelfth embodiment of an air bag mounting structure according to the invention will be described below with reference to FIGS. 1, 20 to 23.

Figure 20:
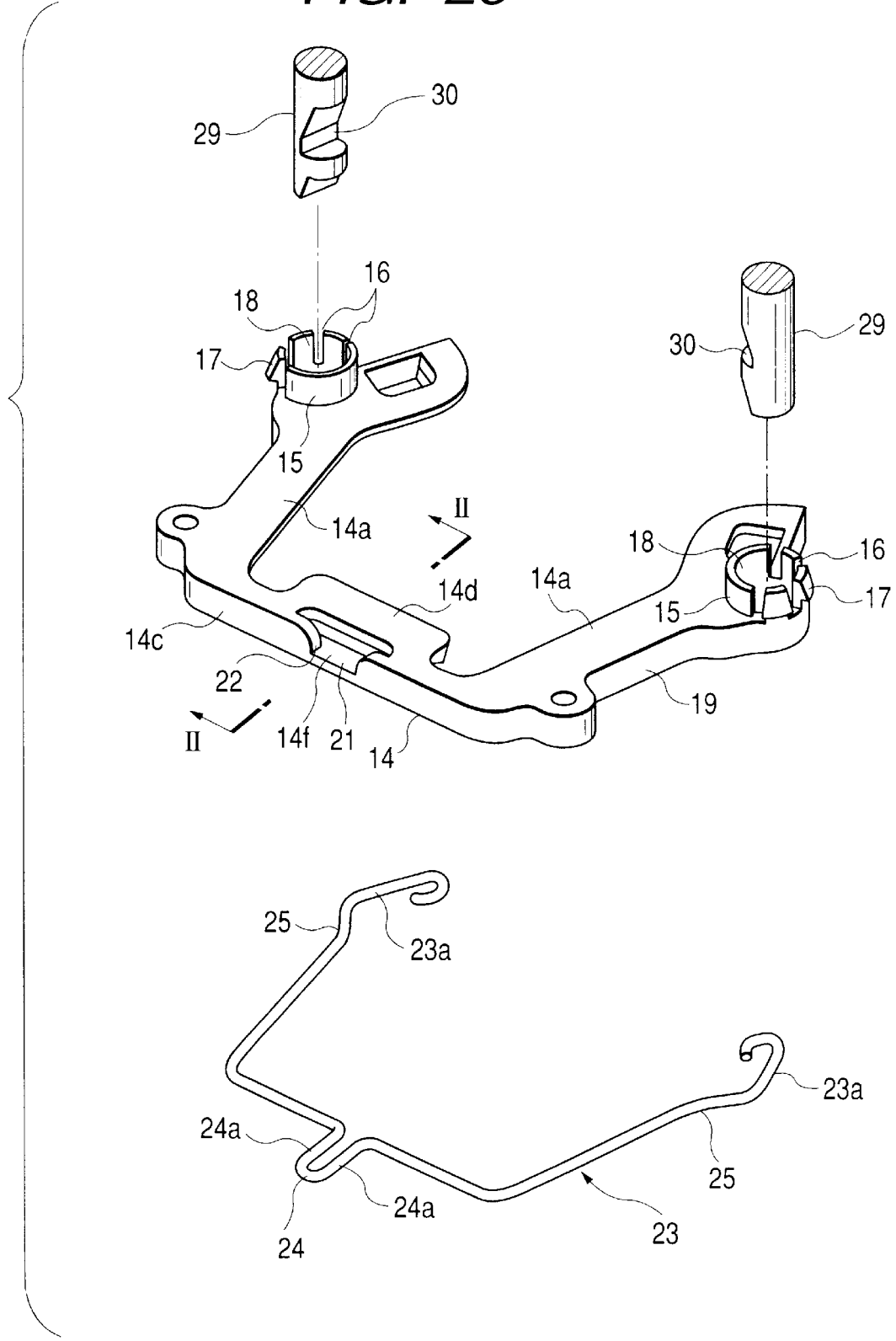
FIG. 20 shows a perspective view showing the mounting structure shown in FIG. 1 which is disassemble, according to a twelfth embodiment.

As shown in FIG. 20, a substantially U-shaped holding member 14 formed of a synthetic resin is to be mounted on a lower surface of the core 11 with a plurality of bolts, not shown.

Figure 21:
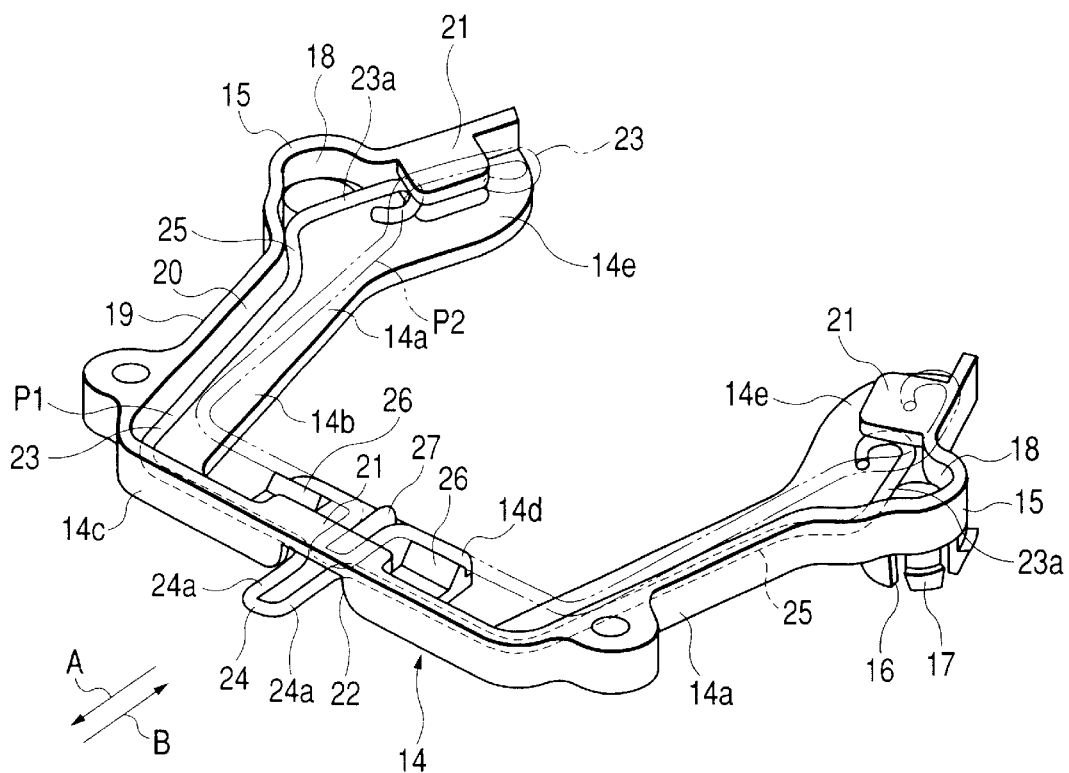
FIG. 21 shows a perspective view of a holding member shown in FIG. 20, as viewed from a bottom side thereof.

As shown in FIGS. 1, 20 and 21, two cylindrical portions 15 are provided, respectively, on outer circumferential edges of both side pieces 14a of the holding member 14 at positions in the vicinity of distal ends thereof in such a manner as to protrude therefrom. A plurality of slits 16 and a pawl 17 are formed, respectively, in and on an external upper edge of each of the cylindrical portions 15. Then, with the holding member 14 being mounted on the core 11, the cylindrical portions 15 are fitted in the through holes 13 in the core 11 and the pawls 17 of the cylindrical portions 15 are brought into engagement with circumferential edges of the through holes 13, respectively. As this occurs, two passage holes 18 are formed in the core 11.

A rib 19 is formed on a lower surface 14b of the holding member 14 along an outer circumferential portion thereof in such a manner as to protrude therefrom, and holding portions are formed on an internal surface of the rib 19 for holding a locking wire 23 acting as a locking body which will be described later. In addition, dislocation preventing portions 21 are formed adjacent to the cylindrical portions 15, respectively, on a lower edge of the rib 19 in such a manner as to protrude inwardly therefrom.

In addition, an opening 22 is formed in a position on the side of the rib 19 along a connecting portion 14c of the holding member 14 which connects both the side pieces 14a. In addition, a dislocation preventing portion 21 is also formed on the lower edge of the rib 19 at a position confronting the opening 22 in such a manner as to protrude inwardly therefrom.

As shown in FIGS. 1, 20, 21 and 23, the locking wire 23 is mounted at the holding portions 20 of the holding member 14 in such a manner as to be moved and displaced in back and forth directions (directions indicated by arrows A, B in FIG. 21). The locking wire 23 is formed of a single continuous resilient metallic wire into substantially a trapezoidal ring-like shape which is partially opened. The locking wire 23 is mounted and disposed at a lock position P1 within the holding portions 20 on the holding member 14 in a state in which the locking wire 23 is diametrically contracted overall and is prevented from being dislocated by the dislocation preventing portions 21.

Then, with the locking wire 23 being disposed at the lock position P1, locking portions 23 formed at two positions in the vicinity of ends of the locking wire 23 are disposed in the passage holes 18, respectively, in such a manner as to extend over the passage holes 18 in a direction in which the locking portions 23a intersect with axes of the passage holes 18. In other words, in this state, the respective locking portions 23a on the locking wire 23 are disposed so as to face the interior of the passage holes 18, respectively.

An operating portion 24, which is bent into substantially a U-shape, is formed on the locking wire 23 at a position confronting the opening 22 in the holding member 14. With the locking wire 23 being mounted on the holding member 14, the operating portion 22 is adapted to protrude forward through the opening 22.

In addition, a concave recess portion 25 is formed adjacent to each of the locking portions 23a on the locking wire 23. Then, when the operating portion 24 is pushed in the direction B as viewed in FIG. 3, the locking wire 23 is moved to be disposed at a rear release position P2 as indicated by chain double-dashed lines. As this occurs, the recess portions 25 of the locking portions 23a are allowed to confront the passage holes 18, respectively, so that the locking wire 23 is withdrawn from the interior of each of the passage holes 18.

Thus, the operating portion 24 serves to change over the locking portion 23 between the lock position P1 and the release position P2 so as to be disposed at the positions, respectively. Then, when the locking wire 23 is disposed at the lock position P1, a lockable status is provided in which an air bag module 28 can be locked onto the steering wheel. On the contrary, when the locking wire 23 is disposed at the release position P2, a removable status is provided in which the air bag module 28 can be removed from the steering wheel.

As shown in FIGS. 1 and 20, two pins 29 are provided on a bottom of the air bag module 28 which is to be mounted on the core 11 of the steering wheel in such a manner as to protrude therefrom, and a hook portion 30 is formed in a distal end of each pin 29 in such a manner as to protrude inwardly. Then, when the air bag module 28 is mounted on the core 11 of the steering wheel, the pins 29 are allowed to pass through the passage holes 18, respectively, whereby the locking portions 23a of the locking wire 23 which are disposed so as to extend over the passage holes 18, respectively, are brought into a resilient engagement with the hook portions 30 in the pins 29, respectively, from inside. In this status, the locking wire 23 is slightly separated away from the holding portions 20, and the locking portions 23a are then brought into a press engagement with the hook portions 30 by virtue of the resiliency of the locking wire 23 itself, whereby the air bag module 28 is locked and held onto the core 11 at two locking locations.

In addition, in a state in which the air bag module 28 is so mounted, when the operating portion 24 on the locking wire 23 is operated to be pushed in the direction indicated by the arrow B, the locking wire 23 is moved to be displaced from the front (a connecting portion 14c side of the holding member 14) lock position P1 to the rear (a distal end side of the holding member) release position P2. Then, the locking wire 23 is constructed so as to be diametrically contracted at an open end thereof against its own resiliency, as shown by chain lines in FIG. 23, along the internal surface of the rib 19 at the distal ends of the holding portions 20. As the locking wire 23 is so moved to be displaced, the locking portions 23a of the locking wire 23 are separated away from the hook portions 30 in the pins 29, respectively, and the recess portions 25 on the locking wire 23 are allowed to be disposed so as to confront the hook portions 30, respectively, whereby the engagement between the locking wire 23 and the pins 29 at the two locking locations is released at one time.

Figure 22:
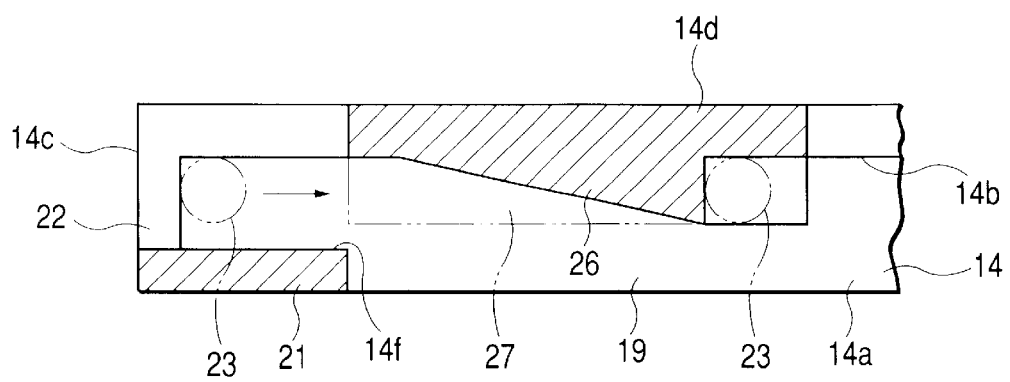
FIG. 22 shows a partially enlarged cross-sectional view taken along the line II—II of FIG. 21.
Figure 23:
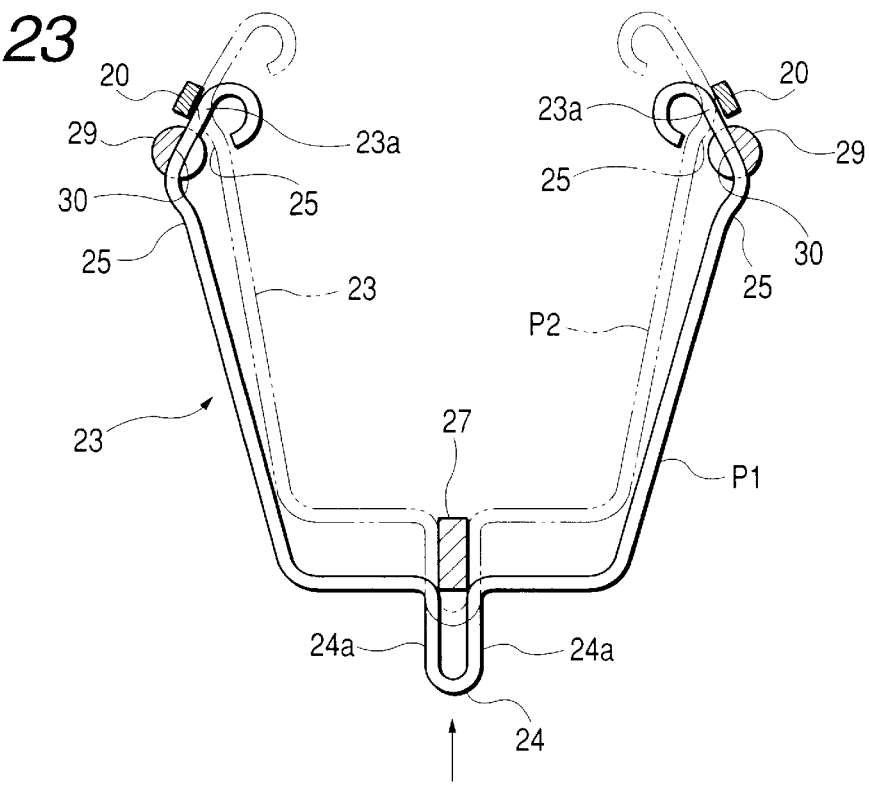
FIG. 23 shows a horizontal cross-sectional view showing a state in which a locking wire engages with pins according to the twelfth embodiment.

As shown in FIGS. 20 to 22, an extended portion 14d is formed on the lower surface 14b of the holding member 14 at a position which confronts the opening 22 in the connecting portion 14c of the same holding member 14 in such a manner as to extend inwardly. Two inverted angle-like elongate engagement projections 26 are formed at positions in the vicinity of an inner edge of the lower surface 14b of the extended portion 14d so as to be positioned on sides of the opening 22. In addition, an elongate guide projection 27 acting as a guide member is formed on the lower surface 14b at a position confronting the extended portion 14d so as to intersect substantially at right angles with a direction in which the elongate engagement projections 26 extend. The direction in which the elongate guide projection 27 extends conforms to the direction in which side portions 24a of the U-shaped operating portion 24 on the locking wire 23 extend and coincides with the directions in which the operating portion 24 is operated or the directions indicated by the arrows A, B in FIG. 3.

Then, as shown by chain lines in FIG. 22, when the locking wire 23 is moved to the rear release position P2 with the operating portion 24 being guided by the elongate guide projection 27, part of the locking wire 23 is brought into engagement with the elongate engagement projections 26 to thereby be locked and held at the release position P2. In addition, when a portion of the extended portion 14d in the vicinity of a rear end portion 14e thereof is lifted up from this state so as to move the elongate engagement projections 26 upwardly or the operating portion 24 on the locking wire 23 is pushed down, the engagement between the locking wire 23 and the elongate engagement projections 26 is released. The locking wire 23 is then moved and returned from the rear release position P2 to the front lock position P1 by virtue of its own resiliency.

Next, the operation of the air bag module mounting structure constructed as described above will be described below.

Firstly, in a case where the air bag module 28 is mounted on the core 11 of the steering wheel, as shown in FIG. 1, the two pins 29 provided so as to protrude from the lower surface of the air bag module 28 are allowed to pass through the two passage holes 18 formed in the holding member 14 which is mounted on the core 11 of the steering wheel, respectively. Then, the locking wire 23 disposed at the lock position P1 on the lower surface of the holding member 14 resiliently deforms within the respective passage holes 18 in such a manner as to be press withdrawn inwardly by the pins 29. Then, when the pins 29 are allowed to pass through the passage holes 18 to such an extent that the hook portions 30 therein come to confront the locking wire 23, the locking portions 23a on the locking wire 23 are brought into a resilient engagement with the hook portions 30 from inside by virtue of its own resiliency, whereby the air bag module 28 is locked and held onto the steering wheel at the two locking locations. Thus, the air bag module 28 can be mounted on the steering wheel easily and quickly through a one-touch or single operation.

In addition, with the air bag module 28 being so mounted, when the air bag module 28 needs to be removed from the core 11 of the steering wheel for replacement or the like the following operation will be carried out. Namely, the operating portion 24 on the locking wire 23 which is protruding forward through the opening 22 in the holding member 14 to be in the lockable status is operated and changed over so as to be displaced rearward (in the direction indicated by the arrow B). Then, the locking wire 23 is moved from the lock position P1 to the release position P2 with the operating portion 24 being guided by the elongate guide projection 27 and is diametrically contracted at the open end against its own resiliency, whereby the engagement between the locking portions 23a on the locking wire 23 and the hook portions 30 in the pins 29 is released at one time at the two locking locations, as shown by chain lines in FIG. 23, and the locking wire 23 is now disposed in the removable status where the air bag module 28 can be removed from the steering wheel. Moreover, as this occurs, the locking wire 23 is held in the removable status through the engagement with the elongate engagement projections 26 on the extended portion 14d. Thus, being released from the locked state through a one-touch or single operation, the air bag module 28 can be removed from the core 11 of the steering wheel easily and quickly.

Thus, according to this embodiment, the following advantages can be obtained.

(17) According to the air bag module mounting structure, the locking wire 23 is constituted by the single continuous resilient metallic wire adapted to be brought into engagement with the hook portions 30 in the plurality of pins 29. In addition, the locking wire 23 is provided with the operating portion 24 for operating the locking wire 23 so as to change it over between the lockable status and the removable status.

Thus, the engagement between the hook portions 30 in the pins 29 on the air bag module side and the locking wire 23 at the plurality of locking locations is released at one time by only moving the locking wire 23 so as to displace it from the lockable status to the removable status. As a result, the air bag module 28 can be removed from the steering wheel easily and quickly.

(18) According to the air bag module mounting structure, the elongate guide projection 27 is provided on the holding member 14 in such a manner as to extend in the directions in which the operating portion 24 on the locking wire 23 is operated and to be positioned between the side portions 24a of the operating portion 24.

Thus, when the operating portion 24 is changed over so as to move and displace the locking wire 23, the operating portion 24 is guided by the elongate guide projection 27. As a result, the looseness of the operating portion 24 is prevented, whereby the locking wire 23 can be displaced easily and smoothly. Consequently, the locking wire 23 can be changed over between the lockable status and the removable status easily and smoothly for disposition thereat, whereby the air bag module 28 can be mounted on and removed from the steering wheel more easily and quickly.

Next, referring to FIGS. 24 and 25, a thirteenth embodiment of an air bag module mounting structure according to the invention will be described below by describing mainly portions which are different from the first embodiment.

In the air bag module mounting structure according to the twelfth embodiment, the locking wire 23 is described as a type in which the operating portion 24 is pushed back and forth relative to the holding member 14 so as to be changed over between the lockable status and the removable status. In contrast this, as shown in FIGS. 24 and 25, in the air bag module mounting structure according to the second embodiment, a locking wire 41 acting as a locking body is described as a type in which the locking wire is changed over between a lockable status and a removable status for disposition thereat by rotating an operating portion 42 relative to a holding member 43.

Figure 24:
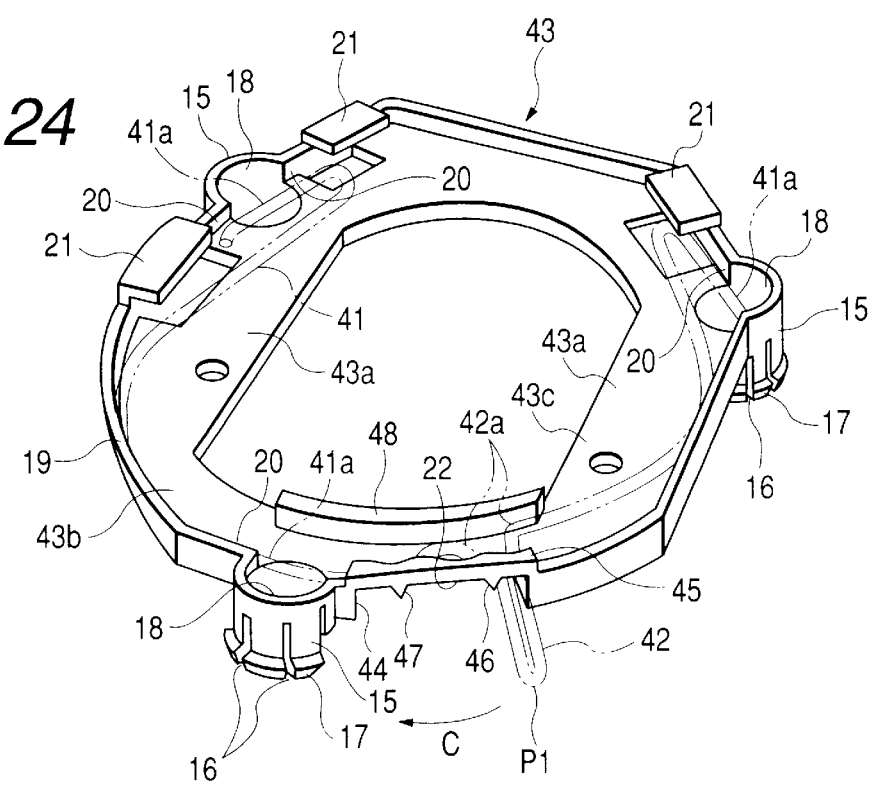
FIG. 24 shows a perspective view of a holding member according to a thirteenth embodiment, as viewed from a bottom side thereof.

In addition, the holding member 43 is formed into substantially an annular shape, and cylindrical portions 15 are formed at three positions such as positions in the vicinity of one ends of both the side pieces 43a and a position in the vicinity of the center of the connecting portion 43b connecting the side pieces 43a to each other on a front side as viewed in FIG. 24. That is, with this holding member 43 being mounted on a core 11, there are produced three passage holes 18 in the holding member 43. In this case, it is preferable to use an air bag module 28 having three pins 29 formed on a bottom of an air bag module 28.

An opening 44 formed in the connecting portion 43b of the holding member 43 is formed longer in a circumferential direction when compared with the opening 22 in the holding member 14 of the twelfth embodiment. Two elongate engagement projections 46, 47 are formed at a predetermined interval on an upper surface of a dislocation preventing portion 45 formed so as to confront the opening 44 in such a manner as to extend in a radial direction of the holding member 43.

The locking wire 41 is formed of a single continuous resilient metallic wire into substantially a circular shape which is partially opened. When the locking wire 41 is mounted on holding portions 20 on the holding member 43 so as to be dispose data lock position P1, three locking portions 41a formed at positions substantially confronting the passage holes 18, respectively, are disposed to extend over the respective passage holes 18 so as to intersect with axes of the passage holes 18.

In addition, an operating portion 42 bent into substantially a T-shape is formed on the locking wire 41 at a portion confronting the opening 44 in the holding member 43. With the locking wire 41 being mounted on the holding member 43, the operating portion 42 is constructed so as to protrude forward through the opening 44. Then, when the locking wire 41 is disposed at the lock position P1 (refer to FIG. 24) the operating portion 42 engages with one of the elongate engagement projections 46, whereby the locking wire 41 is adapted to be held at the lock position P1. On the contrary, when the operating portion 42 is rotated in a direction indicated by an arrow C in FIG. 24 so that the locking wire 41 is disposed at the release position P2 (refer to FIG. 25), the operating portion 42 engages with the other elongate engagement projection 47, whereby the locking wire 41 is adapted to be held at the release position P2.

A elongate guide projection 48 as a guide member is provided along an inner circumferential edge on a lower surface 43c of the connecting portion 43b of the holding member 43 in such a manner as to extend in operating (rotating) directions of the operating portion 42 along an upper bottom portion 42a of the operating portion 42. Then, the operating portion 42 of the locking wire 41 is operated so as to be rotated, the upper bottom portion 42a of the locking wire 41 is allowed to slide over the elongate engagement projection 48, whereby the rotation of the operating portion 42 is guided when the locking wire 41 is changed over between the lock position P1 and the release position P2 for disposition thereat.

In addition, with the air bag module 28 being mounted on the core 11 of the steering wheel, when the locking wire 41 is rotated from the lock position P1 to the release position P2, the hook portions 30 in the pins 29 are separated away from the locking portions 41a and are disposed so as to confront recess portions 25, whereby the engagement between the locking portions 41a of the locking wire 41 and the hook portions 30 at the three locking locations is released.

Next, the operation of the air bag module mounting structure constructed as described above will be described below.

Firstly, in a case where the air bag module 28 is mounted on the core 11 of the steering wheel, the locking wire 41 is disposed at the lock position P1 within the holding member 43, and the operating portion 42 on the locking wire 41 is brought into engagement with the elongate engagement projection 46. In this status, as in the case with the first embodiment, the three pins 29 provided on the bottom of the air bag module 28 in such a manner as to protrude therefrom are allowed to pass through the passage holes 18, so that the hook portions 30 in the pins 29 are brought into a resilient engagement with the locking portions 41a of the locking wire 41, respectively.

In contrast, when the air bag module 28 needs to be removed from the core 11 of the steering wheel, the operating portion 42 which protrudes forward through the opening 44 in the holding member 43 is operated so as to be rotated in the direction indicated by the arrow shown in FIG. 24. As this occurs, the operating portion 42 on the locking member 42 is operated to be rotated until the operating portion 42 rides over the elongate engagement projection 46 and the elongate engagement projection 47. As this occurs, the rotation of the operating portion is guided by the elongate guide projection 48 on the holding member 43, whereby the operating portion 42 and the elongate engagement projection 47 are brought into engagement with each other, the locking wire 41 is changed over from the lock position P1 to the release position P2 for disposition thereat and held at the release position P2.

Figure 25:
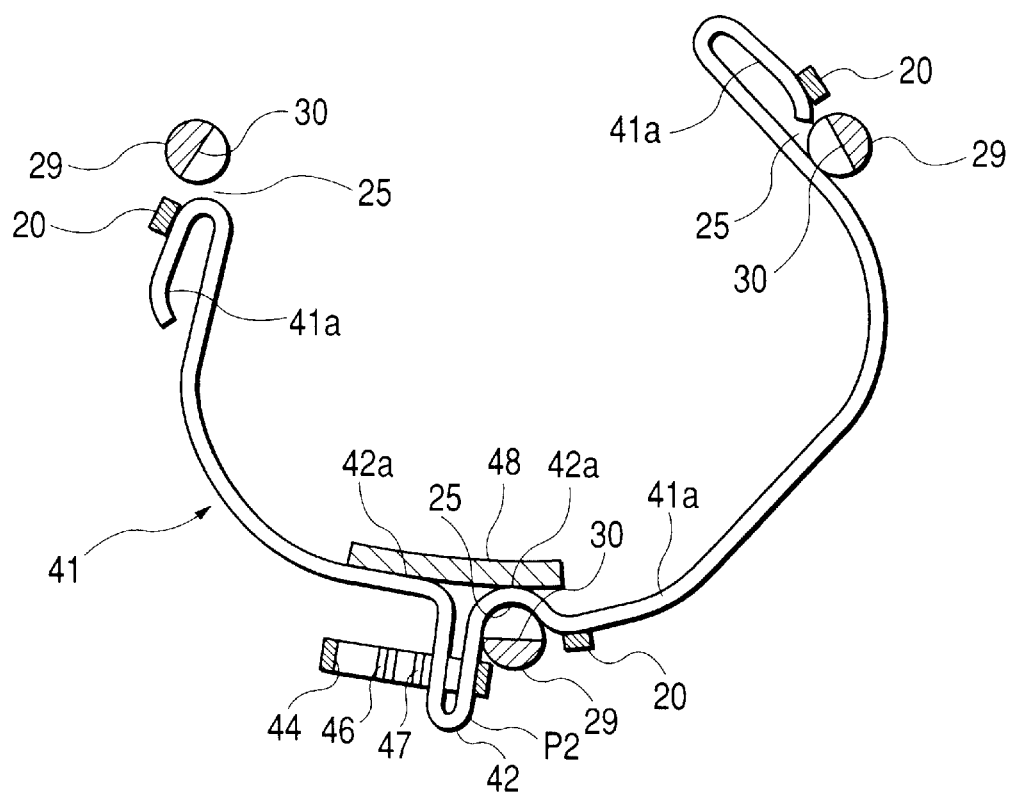
FIG. 25 shows a horizontal cross-sectional view showing a state in which a locking wire engages with pins according to the thirteenth embodiment.

In this state, as shown in FIG. 25, the hook portions 30 in the pins 29 are separated away from the locking portions 41a on the locking wire 41 at the respective locking locations and is disposed so as to confront the recess portions 25, whereby the engagement between the locking portions 41a on the locking wire 41 and the hook portions 30 in the pins 29 is released at one time at the three locking locations. Thus, similarly to the first embodiment, the air bag module 28 is released from the locked status through a one-touch or single operation, whereby the air bag module 28 can be removed easily and quickly.

On the other hand, in a case where the air bag module 28 is re-mounted on the core 11 of the steering wheel, firstly, the operating portion 42 on the locking wire 41 is operated so as to be rotated in an opposite direction to that used when the air bag module is removed. Then, when the operating portion 42 is operated so as to ride over the elongate engagement projection 47 and then the elongate engagement projection 46, the operating portion 42 is eventually brought into engagement with the elongate engagement projection 46, whereby the locking wire 41 is held at the lock position P1. In this state, as has been described before, the pins 29 on the air bag module 28 are allowed to pass through the passage holes 18 in the holding member 43, respectively, so that the locking wire 41 is brought into a resilient engagement with the hook portions 30 in the pins 29.

Thus, according to this embodiment, in addition to advantage substantially similar to above set forth of the twelfth embodiment, the following advantage can be obtained.

According to this air bag module mounting structure, the elongate guide projection 48 is provided on the holding member 43 in such a manner as to extend not only in the directions in which the operating portion 42 is operated but also along the upper bottom portion 42a of the operating portion 42.

Thus, when the operating portion 42 is operated and changed over so as to move the locking wire 41 so as to displace the same the operating portion 42 is guided by the elongate guide projection 48. As a result, the looseness of the operating portion 42 is prevented, whereby the locking wire 41 can be displaced easily and smoothly. Thus, the locking wire 41 can be changed over between the lockable status and the removable status easily and smoothly, whereby the air bag module 28 can be mounted on and dismounted from the steering wheel more easily and quickly.

In addition, the respective embodiments which have been described heretofore may be modified as will be described below to embody the invention.

In the respective embodiments, the number of locking locations where the locking wire 23, 41 is locked to the hook portions 30 in the pins 29 may be changed to, for example, five or greater.

In the respective embodiments, the locking wire 23, 41 may be divided into a plurality of portions, and the engagement projection 26 or the elongate engagement projections 43, 44 may be provided so as to confront the plurality of divided portions of the locking wire 23, 41.

In the first embodiment, the release portion 27 on the holding member 14 may be omitted. In this case, in order to return the locking wire 23 disposed at the release position P2 to the lock position P1, a tool such as a screw driver needs to be used to move the locking wire 23 so disposed in such a manner that the locking portion 23a rides over the engagement projection 26. However, this operation of so moving the locking wire can be carried out in a state in which the air bag module 28 is removed from the core 11 of the steering wheel. Consequently, the required moving operation can be troublesome in no case.

In the respective embodiments, the hook portions 30 in the pins 29 of the air bag module 28 may be constructed to be brought into engagement with the locking wire 23, 41 from inside.

In the fourth embodiment, instead of the pair of hook portions 30 which come into engagement with the locking portions 23a provided on both sides of the locking portion 23 at the front thereof, as shown by chain lines in FIG. 11, it may be constructed such that a single hook portion 30 is provided so as to be brought into engagement with the locking wire 23 at a position along the front edge thereof, so that the air bag module 28 is locked and held onto the core 11 of the steering wheel at the three locking locations.

In the fifth to seventh embodiments, instead of the single hook portion 30 which comes into engagement with the locking portion 23a on the front edge of the locking wire 23, as shown by chain lines in FIGS. 12 to 14, it may be constructed such that a pair of hook portions 30 is provided so as to be brought into engagement with the locking wire 23 at the front on both sides thereof, so that the air bag module 28 is locked and held onto the core 11 of the steering wheel at the four locking locations.

In the twelfth embodiment, the elongate guide projection 27 is constructed so as to be provided on the lower surface 14b of the extended portion 14d on the connecting portion 14c of the holding member 14. However, the location where the elongate guide projection 27 is provided is not limited to the lower surface 14b. For example, the elongate guide projection 27 may be constructed so as to be provided on the upper surface 14f (refer to FIG. 20) of the holding member 14 at the dislocation preventing portion 21.

In the twelfth and thirteenth embodiments, the elongate guide projections 27, 48 are provided as a guide member. On the contrary, instead of the elongate guide projections 27, 48, one or a plurality of projections may be provided. Note that in a case where a plurality of projections are provided, it is desirable that projections are provided along the directions in which the operating portions 24, 42 on the locking wires 23, 42 are operated.

In the respective embodiments, the pins 29 are provided on the bottom of the air bag module 28 in such a manner as to protrude therefrom, and the passage holes 18 are formed in the holding members 14, 43. In contrast to this construction, pins may be provided on the steering wheel main body in such a manner as to protrude therefrom, and passage holes may be formed in the bottom of the air bag module 28 through which the pins on the steering wheel main body are allowed to pass. In a case where such a structure is adopted, a locking wire adapted to be brought into engagement with the pins on the steering wheel main body is held onto the air bag module.

Figure 26:
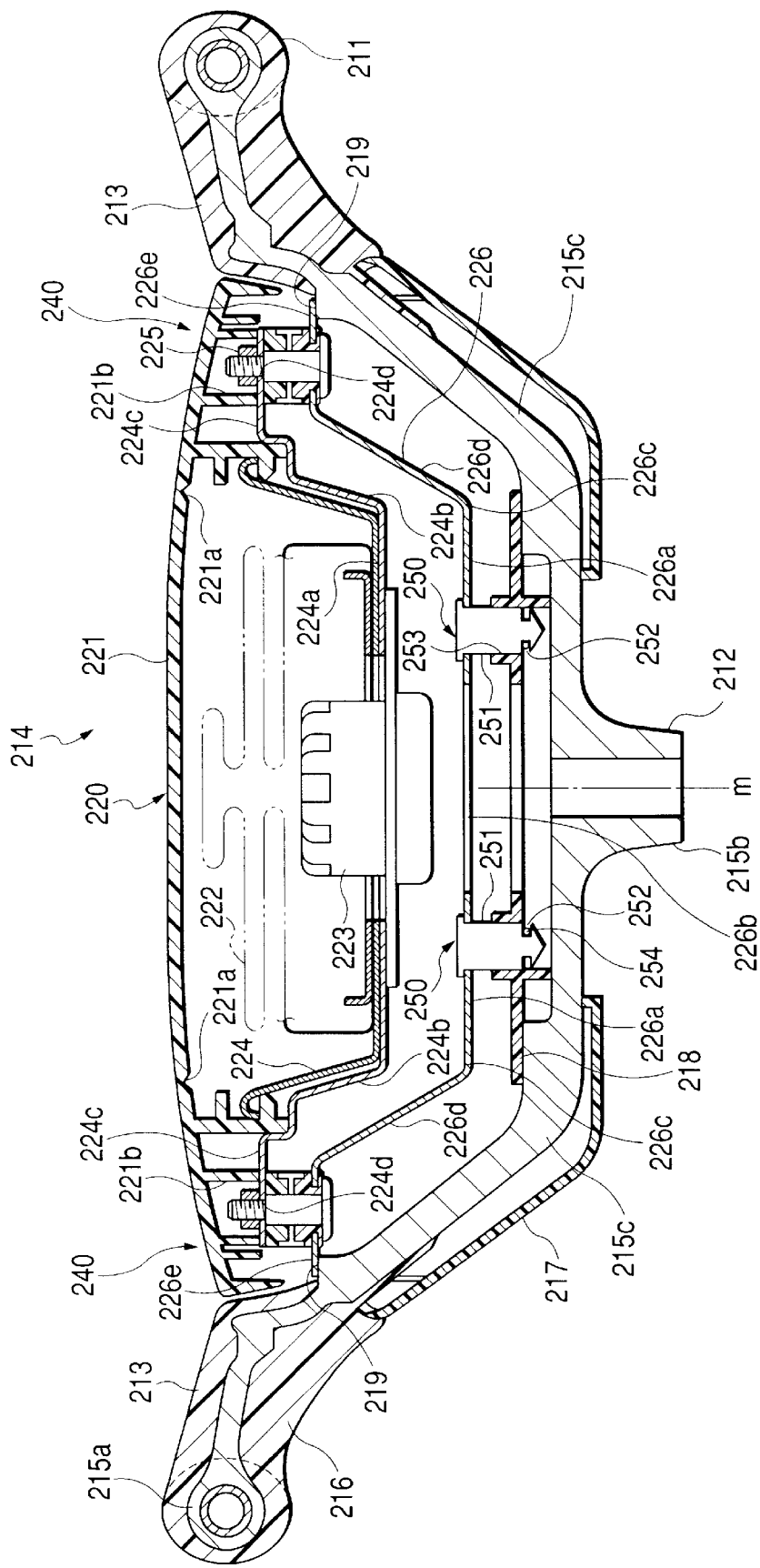
FIG. 26 shows a cross-sectional view of a steering wheel according to a fourteenth embodiment of the invention.
Figure 27:
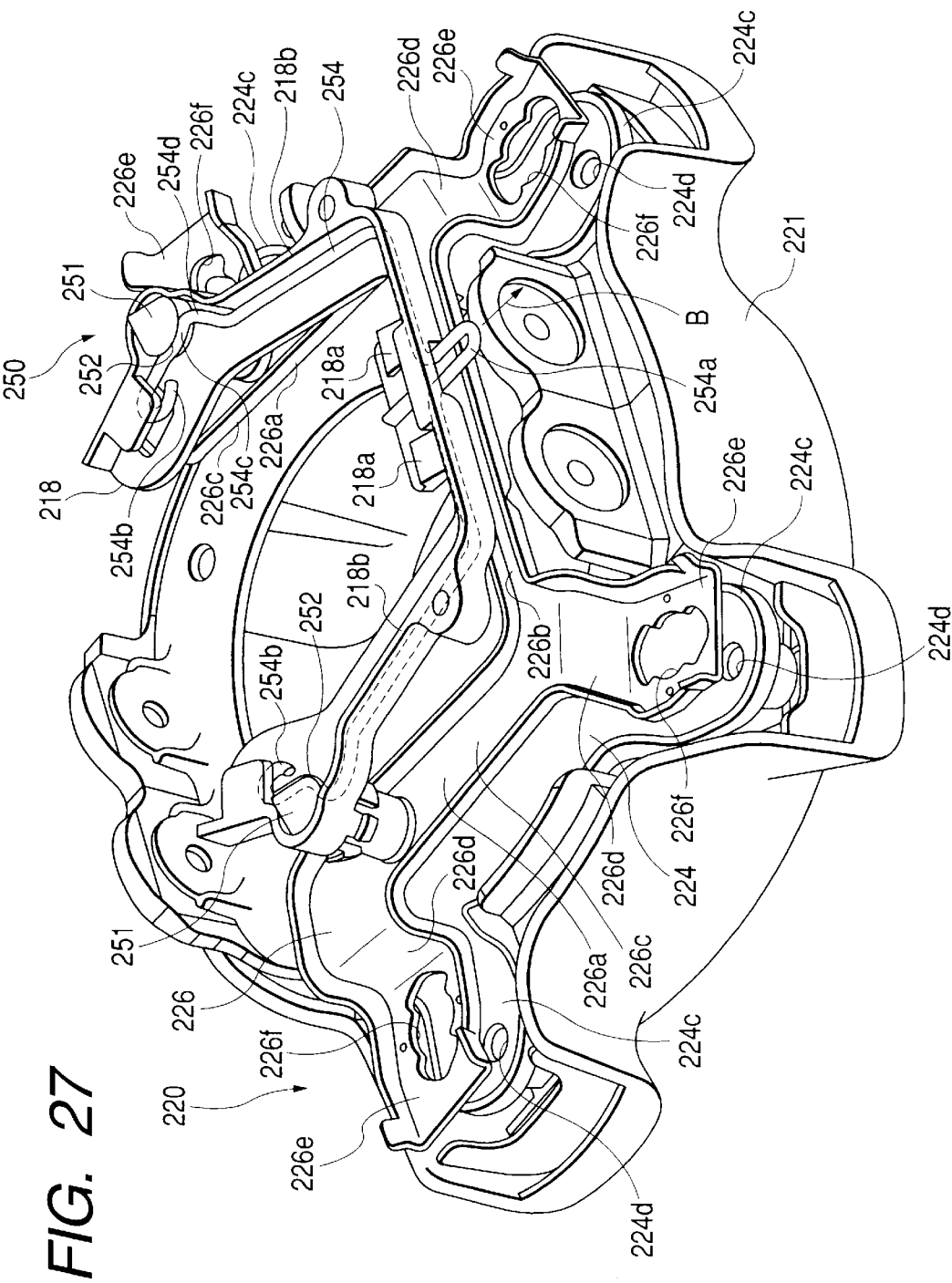
FIG. 27 shows a perspective view showing part of an air bag module according to the same embodiment of the invention.
Figure 28:
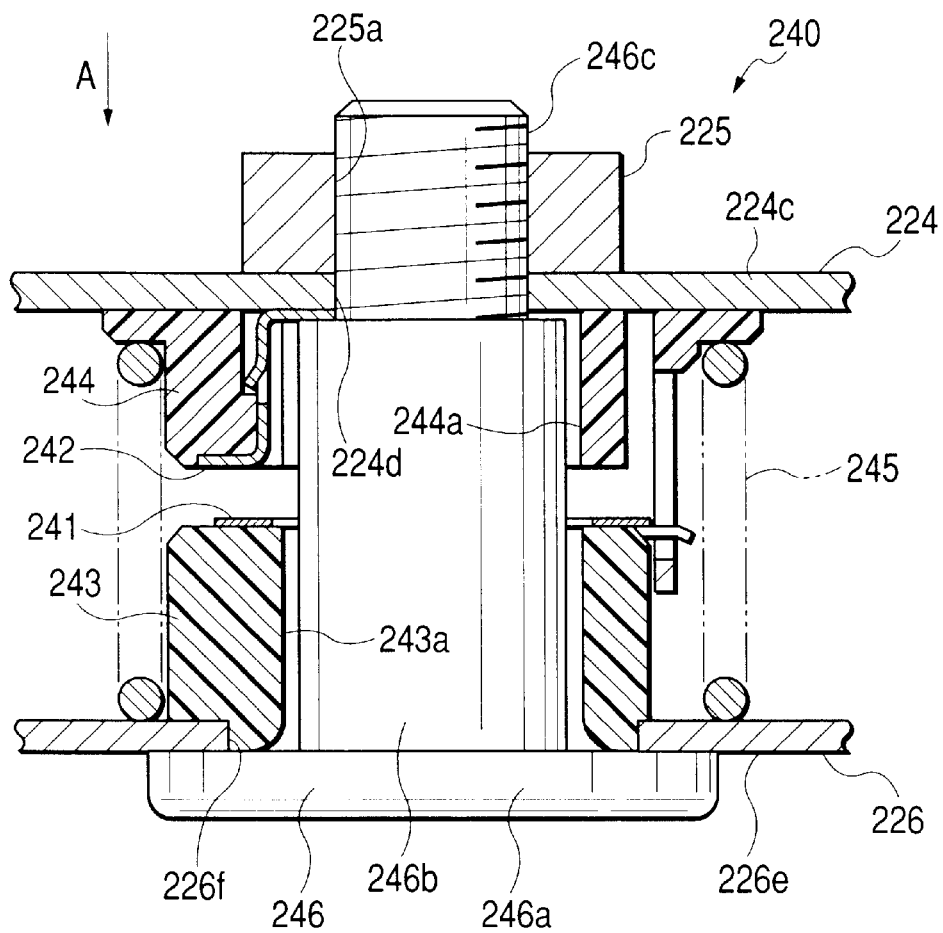
FIG. 28 shows a cross-sectional view of a horn switch mechanism.
Figure 29:
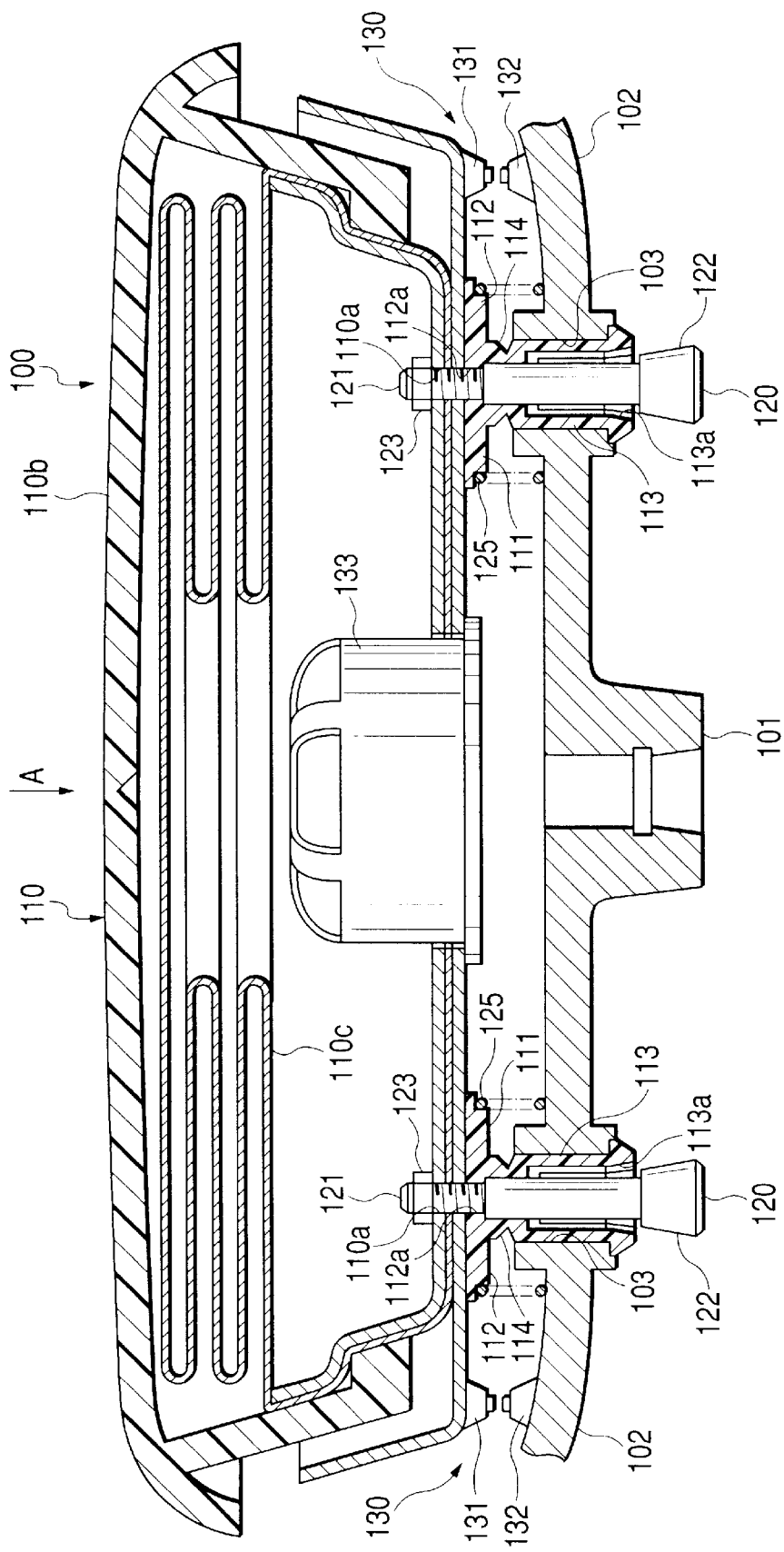
FIG. 29 shows a cross-sectional view of a steering wheel.

Referring to FIGS. 26 to 28, a fourteenth embodiment of a steering wheel with an air bag apparatus according to the invention will be described below.

As shown in FIG. 26, a steering wheel according to the embodiment comprises a rim portion 211 formed into an annular shape, a boss portion 212 disposed at the center of rim portion 211 and four (only two are shown in FIG. 26) spoke portions 213 connecting the rim portion 212 and the boss portion 211. Then, a steering wheel main body 214 is constituted by the rim portion 211, the boss portion 212 and the spoke portions 213. In addition, an air bag module 220 having an air bag cover 221 adapted to oscillate is disposed on the steering wheel main body above the boss portion 212.

The steering wheel main body 214 comprises a rim core 215a corresponding to the rim portion 211, a boss portion core 215b corresponding to the boss portion 212 and spoke portion cores 215c corresponding to the spoke portions 213 and is constructed by connecting the respective cores 215a to 215c. A coating layer 216 formed, for example, of a resin material such as urethane is formed over the rim portion core 215a and a rim portion core 215a side of each of the spoke portion cores 215c and a lower cover is provided over a part of the boss portion core 215a and a portion of the spoke portion core 215c which is not covered with the coating layer 216 so as to cover external surfaces thereof. The lower cover 217 is fastened to the boss portion core 215b with screws, not shown. In addition, a fixing plate 218 for fixing the air bag module 220 to an upper surface thereof is disposed on the boss portion core 215b, and this fixing plate 218 is bolted with bolts and nuts which are not shown. A steering shaft, not shown, is connected to the steering wheel via the boss portion core 215b, so that the rotation of the steering wheel is transmitted to the steering shaft.

In addition, the air bag module 220 comprises a bag-like air bag 222 which is folded down in such a manner as to be expanded, an inflator 223 for supplying the air bag 222 with an expansion gas, the aforesaid air bag cover 221 for covering the air bag 222 so folded down and a bag holder 224 for holding the air bag 222, the inflator 223 and the air bag cover 221. Here, the air bag 222, the inflator 223 and the bag holder 224 are bolted down with bolts and nuts which are not shown.

The air bag cover 221 is formed of a resin material, and for example, H-shaped tear lines 221a which are adapted to be forcibly broken through the expansion and deployment of the air bag 222 are formed in the back of the air bag cover at a central portion thereof in such a manner as to sink therein. In addition, rib portions 221b are formed on the back of the air bag cover at positions in the vicinity of the edge thereof which constitute four (only two are shown in FIG. 26) movable contact plates which are adapted to be brought into contact with extended portions 224c of the bag holder 224, which will be described later.

Additionally, the bag holder 224 is formed of a sheet-like metallic material. The bag holder 224 comprises a bottom portion 224a to which the inflator 223 or the like is bolted down, a side wall portion 224b extending upwardly from the bottom portion 224a toward the respective spoke portions 213 and the four (only two are shown in FIG. 26) extended portions 224c provided so as to extend outwardly from an upper end portion of the side wall portion 224b to the respective ribs 221b of the air bag cover 221. A nut 225 is welded to an upper surface of each of the extended portions 224c substantially at a central portion thereof and a through hole 224d is also formed in each of the extended portions 224c which has a diameter which is substantially the same as the inside diameter of internal threads of the nut 225. Then, the bag holder 224 is connected to a stationary contact plate 226 as a stationary plate via horn switch mechanisms 240, which will be described later, provided integrally with the extended portions 224c.

As shown in FIGS. 26 and 27, the stationary plate 226 comprises side pieces 226a disposed on both sides of a center lime m bisecting laterally the steering wheel in a neutral state and a connecting portion 226b connecting those side pieces 226a. In this embodiment, these side pieces 26a and connecting portion 226b are formed so as to have substantially a U-shaped cross section, and a pin portion 251 for a snap-lock mechanism 250 is provided on each of the side pieces 226a in such a manner as to protrude toward the boss portion core 215b. In addition, each side piece 226a has a pin supporting portion 226c as a bottom for supporting the pin portion 251 thereon, side wall portions 226d extending upwardly from the pin supporting portion to the spoke portions 213, respectively and edge portions 226e extending outwardly from upper ends of the side wall portions 226, respectively. The edge portion 226e is provided such that at least part of the edge portion 226e is brought into abutment with the spoke portion core 215c of the associated spoke portion 213 or a stepped portion 219 formed on the coating layer 216 (in FIG. 26, a stepped portion on the spoke portion core 215 is shown).

Additionally, the snap-lock mechanism 250 comprises the pin portion 251 having a hook portion 252 formed in a distal end portion thereof, passage holes 253 formed in the fixing plate 218 fixed to the boss portion 212 at positions confronting the pin portions 251, respectively and a wire 254 as a locking body adapted to be brought into engagement with the hook portions 252 when the pin portions 251 are allowed to pass through the passage holes 253, respectively.

As shown in FIG. 27, the wire 254 is formed into substantially a U-shape and an operating portion 254a is formed centrally on a bottom thereof for operating the wire 254 so as to be changed over between a lock position and a release position. In addition, locking portions 254c are formed on the wire 254 at positions in the vicinity of end portions 254b of the wire which are adapted to be brought into engagement with the hook portions 252 in the pin portions 251, respectively, and an recessed release portion 254d is formed adjacent to the operating portion 254a side of each locking portion 254c. The wire 254 is mounted within the stationary plate 218 in such a manner that the wire presses against a side wall portion 218b of the fixing plate 218 by virtue of its own resiliency when it is located at the lock position. In this state, the locking portions 254c of the wire 254 are disposed so as to face the interior of the passage holes 253, respectively.

Note that when fixing the air bag module 220 relative to the steering wheel main body 214, the operating portion 254a of the wire 254 is pulled out in a direction indicated by an arrow B in FIG. 27 so as to dispose the wire 254 at the lock position. In this state, distal ends of the pin portions 51 on the air bag module 220 are allowed to pass through the passage holes 253 in the fixing plate 218. Thus, as the pin portions 251 are allowed to pass through the passage holes 253 gradually, the wire 254 is resiliently deformed against its resiliency in such a manner that the locking portions 254c of the wire 254 are forcibly displaced so that both the end portions 254b thereof approach each other. With time, when the hook portions 252 in the pin portions 251 are allowed to pass through the passage holes to positions where they confront the wire 254 the locking portions 254c of the wire 254 are brought into engagement with the hook portions 252 in the pin portions 251, respectively by virtue of its own resiliency, whereby the air bag module is locked onto the steering wheel main body 214. Thus, when the respective pin portions 251 are brought into engagement with the wire 254, the stationary contact plate 226 is made not to oscillate relative to the fixing plate 218 (the steering wheel main body 214) and is not allowed to be removed.

On the contrary, when the air bag module 220 is removed from the steering wheel main body 214, the operating portion 254a on the wire 254 is pushed in an opposite direction to the direction indicated by the arrow B, whereby raised locking portions 18a on the fixing plate 218 are brought into engagement with the wire, and the wire is disposed at the release position. In this state, the wire 254 is pushed out to the distal end portion side of the fixing plate 218 even at the end portions 254b thereof. As this occurs, the end portions 254b are resiliently deformed such that the space between the end portions 254b is narrowed along the side wall 218b of the fixing plate 218. At the same time as this occurs the locking portions 254c of the wire 254 are moved toward the distal end portion side of the fixing plate 218 while being resiliently inwardly deformed, and the locking portions 254c are eventually put in a state in which they are dislocated from the passage holes 253. Then, the recessed release portions 254d come to confront the passage hole 253, respectively, a state being thereby produced in which the wire 254 does not face the interior of the passage holes 253, whereby the engagement between the hook portions 252 in the pin portions 251 and the wire 254 is released, and in this state when the air bag module 220 is pulled out toward the air bag cover 221 side thereof, the air bag module 220 is removed from the steering wheel main body 214.

In addition, as shown in FIG. 28, the horn switch mechanism 240 comprises a stationary side member 243 having one of a pair of contacts 242, 242, a movable side member 244 having the other of the pair of contacts 241, 242, a coil spring 245 and a bolt with a collar or collar bolt 246. The stationary side member 243 is disposed on an upper surface side of the stationary contact plate 226, while the movable side member 244 is disposed on a lower surface side of the extended portion 224c of the bag holder 224 so as to be spaced away from the stationary side member 243. The contacts 241, 242 are provided such that the contacts are exposed from opposite surfaces of the stationary side member 243 and the movable side member 244, respectively. In addition, the coil 245 is provided between the extended portion 224c of the bag holder 224 and an edge portion 226e of the stationary contact plate 226 in such a manner as to be wound around the stationary side member 243 and the movable side member 244. Additionally, the collar bolt 246 has a head portion 246a, a core portion 246b and an externally threaded portion 246c. The collar bolt 246 is passed through a passage hole 226f in the edge portion 226e of the stationary contact plate 226, a through hole 243a in the stationary side member 243 and a through hole 244a in the movable side member 244 at the core portion 246b and the externally threaded portion 246c, and furthermore the threaded portion 246c is constructed to be screwed into the internally threaded portion 225a of the nut 225 through a through hole 224d in the bag holder 224. In this embodiment, the horn switch mechanism 240 is provided integrally with the air bag module 220 by screwing the externally threaded portion 246c of the collar bolt 246 into the internally threaded portion 225a of the nut. In the embodiment, as shown in FIG. 26, the horn switch mechanism 240 is provided on the air bag cover 221 side rather than at the pin supporting portion 226c of the stationary contact plate 226. Note that it is desirable that the height of the horn switch mechanism 240 is made to match a height in the vicinity of a height passing through the center of the gravity of the air bag module 220.

In the air bag module 220 constructed as described above, the stationary contact plate 226 is mounted on the steering wheel main body 214 via the snap-lock mechanism 250 and the fixing plate 218 in such a manner as not to oscillate relative to the steering wheel main body. On the other hand, the air bag cover 221 and the bag holder 224 are made to oscillate via the horn switch mechanism 240 between the air bag cover 221 and the stationary contact plate 226.

In addition, the normal operation of the horn on the steering wheel is carried out by pressing an upper portion of the air bag cover 221 of the air bag module 220. As this occurs, the bag holder 224 is moved in a direction indicated by an arrow A in FIG. 28 against the biasing force of the coil spring 245 and the collar bolt 246 is moved in the direction A in conjunction with the movement of the bag holder 224. Then, the space between both the contacts 241, 244 becomes smaller, and when these contacts 241, 242 are brought into contact with each other, the horn is activated. Then, when the upper portion of the air bag cover 221 is no more pressed, the bag holder 224 is moved into an opposite direction to the direction A by virtue of the biasing force of the coil spring 245, and the collar bolt 246 is moved in the direction A in conjunction with the movement of the bag holder 24, whereby the contacts 241, 242 are spaced away, and the horn stops. Then, when the head portion 246a of the collar bolt 246 is brought into abutment with the vicinity of a circumferential edge of the edge portion 226e of the stationary contact plate 226, the bag holder 224 stops moving any farther in the opposite direction to the direction indicated by the arrow A.

Thus, according to the embodiment, the following advantages can be obtained.

(19) In the steering wheel with an air bag device, the horn switch mechanisms 240 are provided integrally with the air bag module. Thus, the control of the stroke of the horn switch mechanism 240 is made possible before the air bag module 220 is assembled to the steering wheel main body 214. Then, when such a stroke control is carried out, since most of the air bag module 220 is exposed to the outside, for example, even if there are errors in producing and assembling the constituent components such as the air bag cover 221 and the collar bolt 246, the stroke of the horn switch mechanism 240 can easily be corrected to the set value.

(20) In the steering wheel with an air bag device, the air bag module 220 is fixed to the steering wheel main body 214 at the pin supporting portions 226c of the stationary contact plate 226 via the snap-lock mechanism 250. Thus, the pin portions 251 of the snap-lock mechanism 250 can be constructed not to oscillate relative to the steering wheel main body 214. As a result of this, the air bag module 220 can be fixed to the steering wheel main body 214 in a stable fashion.

(21) In the steering wheel with an air bag device, the snap-lock mechanism 250 is constituted by the pin portion 251 having the hook portion 252, the passage hole 253 in the fixing plate 218 and the wire 254 adapted to be brought into engagement with the hook portion 252 when the pin portion 251 is allowed to pass through the passage hole 253. In this construction, the air bag module 220 is fixed to the steering wheel main body 214 by allowing the pin portion 251 to pass through the passage hole 253 while displacing the wire so that the hook portion is brought into engagement with the wire 254. The air bag module 220 can not only be mounted on the steering wheel main body 214 with ease using the snap-lock mechanism 250 having such a simple construction but also be fixed to the steering wheel main body 214 in a stable condition.

(22) In the steering wheel with an air bag device, both the side pieces 226a of the stationary contact plate 226 are connected to each other via the connecting portion 226b. Thus, when the pin portions 251 on the stationary contact plate 226 are allowed to pass through the passage holes 253 in the fixing plate 218 both the side pieces 226a are inclined so as to prevent the inclination of the pin portions 251. As a result of this, there is no risk of the support of the air bag module 220 being made to be unstable.

(23) In the steering wheel with an air bag device, the edge portion 226e of the stationary contact plate 226 is constructed so as to be brought into abutment with the stepped portions 219 of the steering wheel main body 214. Thus, even if the driver or passenger of the vehicle strongly presses against the air bag cover 221 of the air bag module 220 with an intention of activating the horn, the deformation of the stationary contact plate 226 by the pressing force can be prevented.

(24) In the steering wheel with an air bag device, the stationary contact plate 226 is formed so as to have substantially a U-shaped cross section. Thus, the strength of the stationary contact plate 226 itself is increased, whereby the deformation of the stationary contact plate 226 is prevented preferably.

(25) In the steering wheel with an air bag device, the pair of pin portions 251 are provided on both the side pieces 226a f the stationary contact plate 226, and the four stepped portions 219 are provided on the steering wheel main body 214. Thus, even if the driver or passenger of the vehicle strongly presses against the air bag cover 221 of the air bag module 220 with an intention of activating the horn, the displacement of the side pieces 226a of the stationary contact plate 226 by the pressing force can be prevented. In addition, the stationary contact plate 226 can be disposed on the steering wheel main body 214 in a stable condition. As a result of this, the abrupt change in the space between the contacts 241, 242 of the horn switch mechanism 240 can be prevented.

(26) In the steering wheel with an air bag device, the horn switch mechanisms 240 are provided at the positions closer to the air bag cover 221 side rather than to the side pieces 226a of the stationary contact plate 226, whereby the horn switch mechanisms 240 are to be provided at the positions in the vicinity of the height of the center of the gravity of the air bag module 220. Thus, even if the vehicle is turned abruptly or the steering wheel is drastically turned, the air bag module 220 can be displaced substantially uniformly as a whole, whereby rolling or the activation of the horn without the driver' or passenger's intention of activating the same can be prevented.

Note that the above embodiment maybe modified as follows.

In this embodiment, illustrated as the snap-lock mechanism 250 is the snap-lock mechanism of a type in which the operating portion 254a on the wire 254 is pushed and pulled to change over the wire 254 between the lock position and the release position so as to dispose the wire 254 thereat. Instead of the snap-lock mechanism so illustrated, a type of snap-lock mechanism may be used in which the operating portion 254a on the wire 254 is rotated along the side wall portion 218b of the fixing plate 218 to thereby change over the wire 254 between the lock position and the release position so as to dispose the wire 254 thereat.

In addition, while the pair of pin portions 251 are provided on the side pieces 226a of the stationary contact plate 226 in the embodiment, the number of pin portions 251 may be set optionally depending upon the size and configuration of the air bag module 220 provided that at least a pair is provided.

Additionally, while the edge portion 226e of the stationary contact plate 226 is constructed to be brought into contact with the stepped portions 219 on the four spoke portions, respectively, in the embodiment, the stepped portions 219 may be constructed to be provided only on any three of the four spoke portions 213.

Furthermore, while the horn switch mechanism 240 is constructed to be provided with the coil spring 245 in the embodiment, for example, a leaf spring, a volute spring or the like may be provided instead of the coil spring 245.

Moreover, while the stationary contact plate 226 is formed so as to have substantially the U-shaped cross section in the embodiment, the stationary contact plate 226 may not be formed so as to have the U-shaped cross section in the event that the stationary contact plate 226 is not deformed by the biasing force of the coil spring 245 when the horn is activated or that the amount of deformation thereof falls within an allowable range.

In addition, while the edge portion 226e of the stationary contact plate 226 is constructed to be brought into abutment with the stepped portions 219 on the spoke portions 213 in the embodiment, there may be provided no such stepped portion 219 in the event that the stationary contact plate 226 is not deformed by the biasing force of the coil spring 245 when the horn is activated or that the amount of deformation thereof falls within an allowable range.

Additionally, while the steering wheel is illustrated in the embodiment in which the fixing plate 218 is provided inwardly of the spoke portion cores 215c, the fixing plate may be disposed outwardly of the spoke portion cores 215c. In this case, the passage holes through which the pin portions 251 are allowed to pass are formed in the boss portion core 215b on the steering wheel main body 214, while the fixing plate 218 functions only to hold the wire 254.

Furthermore, while the pin portions 251 are provided on the pin supporting portions 226c of the stationary contact plate 226 with the passage holes 253 being formed in the fixing plate 218 in the embodiment, the pin portions 251 may be provided on a confronting surface of the steering main body 214 which confronts the bottom of the air bag module 220 in such a manner as to protrude therefrom with the passage holes 253 being formed on the bottom of the air bag module 220.

Moreover, while the air bag module 220 is fixed to the steering wheel main body 214 at the pin supporting portions 226c of the stationary contact plate 226 via the snap-lock mechanism 250 in the embodiment, the air bag module 220 may be fixed to the steering wheel main body 214 at the side wall portions 226d of the stationary contact plate 226 constituting the external surface thereof via the snap-lock mechanism 250.

In addition, as the fixing plate 218, a plurality of fixing plates 218 and locking bodies such as short wires may be provided for each portion where the snap-lock mechanism 250 is provided, and the plurality of fixing plates and locking bodies may be formed integrally.

Additionally, while the air bag module 220 is constructed to be fixed to the steering wheel main body 214 through the engagement between the pin portions 251 having the hook portions 252 and the wire 254 in the embodiment, the air bag module 220 may be constructed to be fixed to the steering wheel main body 214 through engagement between clips having locking pawls and passage holes through which the locking clips are allowed to pass.

The present invention is constructed as has been described heretofore, the invention can provide the following advantages.

The removal of the air bag module can easily be implemented while preventing the abrupt return of the locking body to the lockable status.

Since the locking body is held in the removable status when the air bag module is removed from the steering wheel, the removal of the air bag module can be implemented quickly and more easily.

When the air bag module is re-mounted on the steering wheel, the air bag module can be re-mounted quickly and easily.

The number of parts can be reduced. Moreover, when the air bag module is removed, the single locking body only has to be changed over to and displaced at the removable status, whereby the removal of the air bag module from the steering wheel can be implemented more quickly and easily.

The engagement of the hook portions with the locking body at the plurality of locking locations can be released at one time. Consequently, the removal of the air bag module can be carried out more quickly and easily.

The locking body can automatically be returned to the lockable status by virtue of its own resiliency. Consequently, when the air bag module is re-mounted on the steering wheel, the air bag module can be mounted on the steering wheel more quickly and easily.

The changeover member can be constructed with the simple construction without increasing the number of parts.

The locking body can be held at the release position in a more ensured fashion by brining the operating portion into engagement with the engagement portion.

At least part of the plurality of passage holes and changeover member can easily be formed in and on the holding member formed of a synthetic resin or the like. Then, the locking body can simply be mounted on the core of the steering wheel via the holding member.

The engagement of the hook portions with the locking body at the plurality of locking locations can be released at one time, whereby the air bag module can easily be removed from the steering wheel.

The locking body is diametrically contracted or expanded at the release position, whereby the engagement between the hook portions and the locking body at the plurality of locking locations can easily be released.

The recess portions on the locking body are allowed to confront the hook portions, respectively, by displacing the locking wire to the release position over a small displacement distance, whereby the engagement between the hook portions and the locking body can easily be released.

The locking body can easily be displaced to the release position by operating the operating portion.

The locking body can be held in the mounted status in which the locking body confronts the respective passage holes by the holding portions in an ensured fashion. Then, when the hook portions in the pins are brought into engagement with the locking body, respectively, the locking body is separated away from the holding portions and is brought into a press engagement with the hook portions by virtue of its own resiliency, whereby the air bag module can be locked and held rigidly onto the steering wheel.

The air bag module can be locked and held stably onto the steering wheel at three or more locking locations.

The plurality of passage holes can easily be formed in the holding member formed from a synthetic resin, and the locking body can simply be mounted on the holding member.

When the locking body is operated so as to be moved to the release position, the locking body is contracted diametrically inwardly of the respective pins, whereby the engagement between the locking body and the respective hook portions can easily be released.

When the locking body is operated so as to be moved to the release position, the locking body is contracted diametrically outwardly of the respect pins, whereby the engagement between the locking body and the respective hook portions can easily be released.

The engagement between the hook portions and the locking body at the plurality of locking locations can be released at one time, whereby the air bag module can easily be removed from the steering wheel.

When the locking wire is rotated to the release position, the recess portions on the locking body are allowed to confront the hook portions, whereby the engagement between the hook portions and the locking body can easily be released.

When the operating portion is operated, the locking body can easily be rotated to the release position.

The locking body can be held by the holding portions in the mounted status where the locking body is allowed to confront the respective passage holes in an ensured fashion. Then, when the hook portions in the pins are brought into engagement with the locking body, respectively, the locking body is separated away from the holding portions and is brought into a press engagement with the hook portions, respectively, whereby the air bag module can rigidly be locked and held onto the steering wheel.

The air bag module can stably be locked and held onto the steering wheel at three or more locking locations.

The plurality of passage holes can easily be formed in the holding member formed from the synthetic resin or the like, and the locking body can simply be mounted on the holding member.

Not only can the engagement between the hook portions and the locking body at the plurality of locking locations be released at one time by only displacing the locking body from the lockable status to the removable status, but also the changeover operation of the locking body between the lockable status and the removable status can be performed easily and smoothly. Thus, the air bag module can be mounted on and removed from the steering wheel easily and smoothly.

The stroke of the horn switch mechanism can be corrected to the set value with ease. In addition, the air bag module can be fixed to the steering wheel in the stable condition.

The air bag module can be mounted to the steering wheel with ease and in the stable condition using the snap-lock mechanism having the simple construction.

The pin portions can be prevented from being inclined, whereby there occurs no case where the air bag is supported unstably.

The strength of the stationary plate itself can be increased, whereby even if the driver or passenger of the vehicle strongly presses against the air bag module, the deformation of the stationary plate by the pressing force can be prevented preferably.

The stationary plate can be disposed relative to the steering wheel main body in the stable condition.

Additionally, the performance of rolling resistance can be improved.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

Further, each feature or construction of the aforementioned embodiments can be combined into the possible extent. Accordingly, the dependencies of the claims are preliminary: It is explicitly stated that any combinations of claimed features and/or of features described in the description is intended to be claimed, if appropriate in the course of the grant procedure.

What is claimed is:

1. An air bag module mounting structure for mounting an air bag module on a steering wheel, comprising:
    a plurality of pins provided on one of said air bag module and said steering wheel and each having a hook portion;
    a plurality of passage holes formed in the other of said air bag module and said steering wheel, said pin being inserted into and passing through said passage hole;
    a locking body engageable with said hook portion of said pin inserted into said passage hole to thereby lock said air bag module to said steering wheel; and
    a changeover member provided on one of said air bag module, said steering wheel and said locking body to regulate said locking body and change a state between (i) a locked state where said air bag module and said steering wheel are locked with each other and (ii) a releasable state where said air bag module and said steering wheel are allowed to be separated, wherein said locking body comprises a single continuous resilient wire, and an engagement of said locking body with a plurality of said hook portions, each provided in each of said plurality of pins, is released at one time by displacing said locking body to a release position.

2. An air bag module mounting structure according to claim 1, wherein said locking body is formed into substantially a ring-like shape which is partially opened and is constructed so as to be diametrically contracted or expanded against its own resiliency in conjunction with a movement thereof to said release position.

3. An air bag module mounting structure according to claim 1, wherein a recess portion is formed on said locking body for releasing the engagement of said locking body with said hook portions with said locking body being displaced to said release position.

4. An air bag module mounting structure according to claim 1, wherein an operating portion is provided on said locking body for displacing said locking body to said release position.

5. An air bag module mounting structure for mounting an air bag module on a steering wheel, comprising:
    a plurality of pins provided on one of said air bag module and said steering wheel and each having a hook portion;
    a plurality of passage holes formed in the other of said air bag module and said steering wheel, said pin being inserted into and passing through said passage hole;
    a locking body engageable with said hook portion of said pin inserted into said passage hole to thereby lock said air bag module to said steering wheel; and
    a changeover member provided on one of said air bag module, said steering wheel and said locking body to regulate said locking body and change a state between (i) a locked state where said air bag module and said steering wheel are locked with each other and (ii) a releasable state where said air bag module and said steering wheel are allowed to be separated, wherein said locking body comprises a single continuous wire which is formed into substantially a ring-like shape, and an engagement of said locking body with said plurality of hook portions is released at one time by rotating said locking body to a release position.

6. An air bag module mounting structure according to claim 5, wherein recess portions are formed on said locking body for releasing the engagement of said locking body with said hook portions with said locking body being rotated to said release position.

7. An air bag module mounting structure according to claim 5, wherein an operating portion is provided on said locking body for rotating said locking body to said release position.

8. An air bag module mounting structure for mounting an air bag module on a steering wheel, comprising:
    a plurality of pins provided on one of said air bag module and said steering wheel and each having a hook portion;
    a plurality of passage holes formed in the other of said air bag module and said steering wheel, said pin being inserted into and passing through said passage hole;
    a locking body engageable with said hook portion of said pin inserted into said passage hole to thereby lock said air bag module to said steering wheel; and
    a changeover member provided on one of said air bag module, said steering wheel and said locking body to regulate said locking body and change a state between (i) a locked state where said air bag module and said steering wheel are locked with each other and (ii) a releasable state where said air bag module and said steering wheel are allowed to be separated, wherein said locking body has an operating portion as said changeover member, and a guide member is provided on one of said air bag module and said steering wheel main body for guiding a displacement of said locking body between said locked state and said releasable state, wherein said guide member comprises a projection or an elongate projection disposed in such a manner as to extend in a direction in which said operating portion is operated.

9. An air bag module mounting structure according to claim 8, wherein said locking body comprises a single continuous resilient wire, wherein said operating portion is formed by bending said resilient wire into substantially a U-shape, and wherein said projection or elongate projection is disposed in such a manner as to extend between extreme ends of an operation area of said operating portion.

10. A steering wheel with an air bag device, comprising:
   a steering wheel main body;
   an air bag module having an air bag cover which can oscillate relative to said steering wheel main body; and
   a horn switch mechanism to activate a horn when a pair of contacts disposed spaced away from each other is brought into contact with each other through oscillation of said air bag cover;
   wherein said horn switch mechanism is provided integrally with said air bag module, and wherein said air bag module is constructed so as to be fixed to said steering main body via a snap-lock mechanism on a bottom or an external side thereof, wherein said snap-lock mechanism comprises:
   a plurality of pin portions provided on one of a bottom of said air bag module and a confronting surface of said steering wheel main body which confronts said bottom of said air bag module;
   a plurality of passage holes formed in the other of said bottom of said air bag module and said confronting surface of said steering wheel main body which confronts said bottom of said air bag module; and
   a locking body adapted to be brought into engagement with hook portions formed in said pin portions when said pin portions are allowed to pass through said passage holes, respectively.

11. A steering wheel with an air bag device according to claim 10, wherein said air bag module comprises:
   a stationary plate having said plurality of pin portions; and
   a movable plate adapted to oscillate relative to said stationary plate and having said air bag cover mounted thereon,
   wherein said stationary plate comprises side pieces disposed on both sides of a center line which bisects said steering wheel in a neutral state which are connected to each other.

12. A steering wheel with an air bag device according to claim 11, wherein at least part of said stationary plate is brought into abutment with a stepped portion formed on said steering wheel main body.

* * * * *